(12) United States Patent
Jarisch et al.

(10) Patent No.: US 11,805,936 B2
(45) Date of Patent: *Nov. 7, 2023

(54) MOBILE LIQUID TANK FOR HEATING LIQUIDS

(71) Applicant: SOCIÉTÉ DES PRODUITS NESTLÉ S.A., Vevey (CH)

(72) Inventors: Christian Jarisch, Lutry (CH); Nicolas Camier, Brignais (FR)

(73) Assignee: Societe des Produits Nestle S.A., Vevey (CH)

( * ) Notice: Subject to any disclaimer, the term of this patent is extended or adjusted under 35 U.S.C. 154(b) by 419 days.

This patent is subject to a terminal disclaimer.

(21) Appl. No.: 15/572,324

(22) PCT Filed: Jun. 28, 2016

(86) PCT No.: PCT/EP2016/064931
§ 371 (c)(1),
(2) Date: Nov. 7, 2017

(87) PCT Pub. No.: WO2017/001367
PCT Pub. Date: Jan. 5, 2017

(65) Prior Publication Data
US 2018/0103793 A1    Apr. 19, 2018

(30) Foreign Application Priority Data
Jul. 2, 2015    (EP) .................................... 15174924

(51) Int. Cl.
*A47J 31/56*    (2006.01)
*A47J 31/44*    (2006.01)
(Continued)

(52) U.S. Cl.
CPC ........... *A47J 31/56* (2013.01); *A47J 27/2105* (2013.01); *A47J 27/21016* (2013.01);
(Continued)

(58) Field of Classification Search
CPC .... A47J 27/004; A47J 27/21016–21033; A47J 27/2105; A47J 31/005;
(Continued)

(56) References Cited

U.S. PATENT DOCUMENTS 3,290,484 A * 12/1966 Day .......................... H02J 5/00
219/441
4,503,757 A    3/1985 Daugherty
(Continued)

FOREIGN PATENT DOCUMENTS

WO    2006102980 A1    10/2006

OTHER PUBLICATIONS

International Search Report, dated Sep. 5, 2016, in PCT/EP2016/064931, filed Jun. 28, 2016.
(Continued)

*Primary Examiner* — Matthew P Travers
(74) *Attorney, Agent, or Firm* — K&L Gates LLP

(57) ABSTRACT

A mobile liquid tank is disclosed that includes an insulated tank body and two heating elements. Also disclosed is a liquid heating system comprising the mobile liquid tank, as well as methods of heating a liquid using the mobile liquid tank.

14 Claims, 22 Drawing Sheets

(51) Int. Cl.
  *A47J 31/54* (2006.01)
  *A47J 27/21* (2006.01)
  *A47J 31/00* (2006.01)
  *A47J 31/46* (2006.01)

(52) U.S. Cl.
  CPC ............. *A47J 31/005* (2013.01); *A47J 31/44* (2013.01); *A47J 31/441* (2013.01); *A47J 31/4403* (2013.01); *A47J 31/4407* (2013.01); *A47J 31/462* (2013.01); *A47J 31/54* (2013.01); *A47J 31/545* (2013.01); *A47J 31/4457* (2013.01)

(58) Field of Classification Search
  CPC .... A47J 31/4457; A47J 31/56; A47J 36/2472; A47J 41/0038; A47J 31/4403; A47J 31/4407; A47J 31/462; A47J 31/54; A47J 31/545
  See application file for complete search history.

(56) References Cited

U.S. PATENT DOCUMENTS

| | | | |
|---|---|---|---|
| 9,271,605 B2 | 3/2016 | Boussemart et al. | |
| 10,334,980 B2* | 7/2019 | Jarisch | A47J 31/46 |
| 2005/0271372 A1 | 12/2005 | Knepler | |
| 2008/0041233 A1* | 2/2008 | Bunn | A47J 31/007 99/281 |
| 2008/0092747 A1* | 4/2008 | Yoakim | A47J 31/36 99/295 |
| 2013/0115343 A1 | 5/2013 | Reyhanloo | |
| 2015/0168320 A1* | 6/2015 | Falke | H01J 37/244 250/305 |

OTHER PUBLICATIONS

Written Opinion of the International Searching Authority, dated Sep. 5, 2016, in PCT/EP2016/064931, filed Jun. 28, 2016.

* cited by examiner

MOBILE LIQUID TANK FOR HEATING LIQUIDS

CROSS-REFERENCE TO RELATED APPLICATIONS/INCORPORATION BY REFERENCE STATEMENT

This application is a US national stage application filed under 35 USC § 371 of International Application No. PCT/EP2016/064931, filed Jun. 28, 2016; which claims priority to EP App No. 15174924.9, filed Jul. 2, 2015. The entire contents of the above-referenced patent applications are hereby expressly incorporated herein by reference.

TECHNICAL FIELD

The present disclosure relates to a mobile liquid tank having an insulated tank body for receiving and storing a heated liquid. The present disclosure further relates to a liquid heating system comprising the mobile liquid tank and a tank receiving device. The present disclosure further relates to a method for heating a mobile liquid using the liquid tank.

BACKGROUND

Liquid tanks having an insulated tank body, like thermos flasks, are commonly known in the prior art. Such thermos flasks with insulating walls are frequently used to store hot or cold beverages for "mobile" use. The liquids or contents stored in such thermos flask, however, loose temperature over time in case hot contents are stored in the flasks or they gain temperature over time in case cold contents are stored in the flasks. Moreover, the temperature variation, i.e. the temperature change over time, is dependent on the flask insulating quality and volume. Commonly known flasks are not adapted for storing hot water for an extensive period of time for being used as extraction liquid in the preparation of high quality beverages such as coffee extract. In particular, when the temperature of the liquid drops of a few degrees Celsius, the quality of the extraction of the beverage can be negatively impacted.

There would be a need for a thermos flask or similar tank-type device capable of delivering heated liquid at a controlled temperature suitable for beverage preparation in a mobile beverage preparation machine whether the device is electrically connected to the mains electricity supply or not.

CN104138212 relates to a boiler for coffee maker having separating part arranged on water storage cavity that is arranged on fast heating area, an electric heating component arranged with a fast water heating area and a slow heating area formed with water hole.

WO 2005/053489 relates to a mobile apparatus for preparing beverages comprising a module for delivering a beverage by supplying a pressurized liquid, a liquid feed tank of sufficient capacity for supplying the module with several volumes of liquid for repeatedly supplying more than one beverage, gas-type pressurizing means suitable for supplying the module with pressurized liquid, a liquid feed chamber, of which the capacity is several times smaller than the capacity of the tank; said chamber being arranged, in a filling configuration, to communicate with the tank in order to be filled with liquid and, said chamber being arranged to communicate with the pressurizing means in order to pressurize the liquid in the chamber with gas and to inject pressurized liquid into the module and thereby permit delivery of the liquid through the module.

WO 2006/102980 relates to a standalone drink dispensing machine for delivering a drink by extraction under pressure comprising an extraction module, a water reservoir, a pump, an electrical power supply means for heating the water in the reservoir; the electrical power supply means comprising a low voltage electrical accumulator associated with the machine and configured to supply the pump with electrical current; and the reservoir means comprising heating means having a first electrical element powdered by the accumulator and a second electrical element, independent from the first element able to be powered by the mains in order to heat up water up to the reserve temperature.

The present disclosure seeks to address the above-described problems. The present disclosure also aims at other objects and particularly the solution of other problems as will appear in the rest of the present description.

BRIEF DESCRIPTION OF THE DRAWINGS

Further features, advantages, and objects of the present disclosure will become apparent for a skilled person when reading the following detailed description of embodiments of the present disclosure, when taken in conjunction with the figures of the enclosed drawings.

Figure 1A:
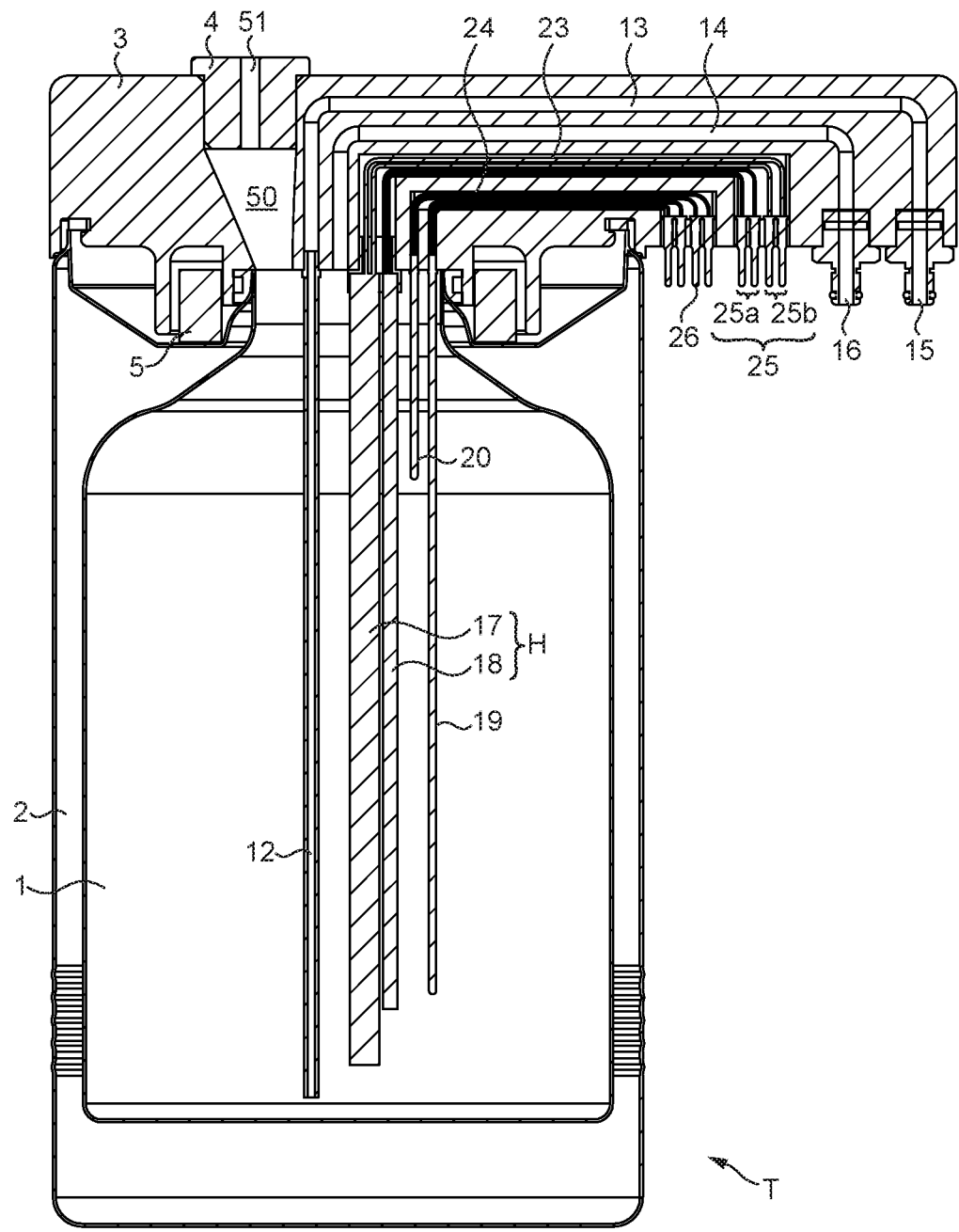
FIG. 1(*a-c*) shows a mobile liquid tank according to a first embodiment of the present disclosure.

In the figures, (a) shows a cross section of the respective device/system/machine, (b) shows a perspective view of the respective device/system/machine, and (c) shows a side view of the respective device/system/machine indicating the intersection line of (a).

DETAILED DESCRIPTION

The present disclosure relates respectively to: a mobile liquid tank, a liquid heating system and a method for heating liquid, as defined in the appended claims.

In a first aspect, the present disclosure relates to a mobile liquid tank (in the following also referred to as "liquid tank"

or "tank" or "flask" or "thermos flask") comprising an insulated tank body for receiving and storing a liquid. In certain non-limiting embodiments, the liquid is a liquid for preparing a beverage, like water for preparing coffee, hot chocolate, tea and the like. The liquid tank further comprises heating means arranged in the tank body for heating the liquid. The heating means comprises a first heating element for heating up the liquid in the tank to a predetermined temperature and a second heating element for maintaining the temperature of the heated liquid in the tank substantially constant. The first heating element is configured to be connectable to an external power source of low voltage and the second heating element is configured to be connectable, separately from the first heating element, to a mobile power source of extra-low voltage like a battery.

By "substantially constant", it is meant that the average temperature of liquid in the tank does not vary of more than +(plus) or −(minus) 5 degrees Celsius, such as (but not limited to) +or −3 degrees Celsius. The terms "low voltage" and high voltage" have the general meaning given by the International Electrotechnical Commission (IEC). Low voltage is defined as between 50 and 1000 V for alternative current or between 120 and 1500 V for direct current. Extra-low voltage is defined as below 50 V AC or below 120 V for DC. It should also be noted that the connectability of the heating elements to the power source, as referred above, does not mean that the power source is connectable to all possible mobile power sources within the given IEC definitions. It just means that the heating elements are adapted for being connected to certain of these sources (e.g., AC or DC or both and/or at a certain threshold or value of voltage).

According to the present disclosure, the mobile liquid tank is designed with two separate heating elements; one for increasing the temperature of the liquid from ambient to the suitable beverage preparation (e.g. extraction) temperature and the second for compensating 100% or nearly 100% of the heat losses during an extensive period of time dependent on the current capacity of the mobile power source. Thereby, an active kind of thermos flask for mobile beverage applications is provided. The first heating element is connectable to the external power source such as by means of a power connector or plug, during heating in order to receive the required power for heating liquid from ambient or below to the beverage preparation temperature. Once the desired temperature has been reached, the main power heating means can be switched off (e.g. unplugged) and the battery power can take over the temperature control to heat the second heating element. Comparatively, the first heating element is capable of delivering higher power than the second heating element. However, an advantage of the two separate heating elements lies in the ability to optimize the heating elements to their dedicated power source. For example, the second heating element can be designed in a more compact manner to deliver more power when supplied by extra-low voltage current.

The mobile liquid tank can further comprise a control unit which is designed to control and operate automatically the first heating element for heating up the liquid in the tank when the first heating element is connected to the external power source (in "assisted energy supply" mode), and to control and operate automatically the second heating element for taking over from the first heating element, the heating of the liquid in the tank when the first heating element is no longer connected to an external power source (i.e. in "autonomous energy supply" mode).

It is thus possible to have the device switched automatically from one heating mode to another (i.e. without user's intervention other than plugging or unplugging the device to the external power source) and without the user necessarily noticing such change of heating mode thereby providing an efficient and convenient device for continuous supply of liquid at a suitable temperature for mobile beverage preparation machines.

The mobile liquid tank can further comprise an external low voltage power supply connector which is connected to the first heating element, such as (but not limited to) via the control unit, and which is connectable to the external low voltage power source (also called hereafter "external power source" for simplification). Hence, an easy connection of the first heating element to an external power source can be provided.

The mobile liquid tank further comprises a mobile power source of extra-low voltage (also called hereafter "mobile power source" for simplification) which is connected to the second heating element, such as (but not limited to) via the control unit. In certain non-limiting embodiments, the mobile power source is rechargeable via the external power supply connector to the external power source. For this, a current transformer if necessary is provided between the mobile power source and the external power supply connector. The transformer can be part of the control unit or be a separate part thereto. Hence, the dedicated mobile power source like a rechargeable battery provides increased mobility to the mobile liquid tank by maintaining the predetermined temperature constant in the autonomous energy supply mode.

The liquid tank may further comprise temperature control sensor means which are provided in the tank. The temperature control sensor means are connected to the control unit and the measured temperature data received from the temperature control sensor means are used as temperature input for controlling the regulation of the heating means. For example, the control unit processes the regulation of the heating elements by switching the heating elements on and off as a function of temperature threshold(s) stored in a memory of the control unit.

The temperature control sensor means may have different lengths so that they extend at two different depths inside the tank body. In a particular (but non-limiting) embodiment, the temperature control sensor means comprise two NTC (Negative Temperature Coefficient). In addition to a temperature control, the sensor means can be utilized advantageously to control the level of liquid into the tank. In particular, the control unit is configured to use the temperature control sensor means of higher length as a low liquid level sensor and the temperature control sensor means of shorter length as a high level liquid sensor.

According to a possible mode, the mobile power source, the main power supply connection means and the control unit are provided in a separate transportable housing connected to and/or being releasably attachable to the tank body. In such case, the liquid tank can be transported easily together with the housing while the liquid in the tank continuing to be heated by the second heating element supplied by the embarked mobile power source.

In certain non-limiting embodiments, the heating means and, optionally the temperature control sensor means, are electrically connected to electrical connectors. In this case, the liquid tank can be conveniently plugged to either a docking station or a beverage machine or to the transportable housing. The first heating element and the second heating element are connected to separate electrical connectors. Moreover, in certain non-limiting embodiments, the connectors protrude from at least one external wall of the tank for connectability to external electrical connectors. Additionally, for facilitating the plugging of the tank to a tank receiving device, a docking station or a transportable control housing, the electrical connectors are, in certain non-limiting embodiments, plug-type connector which are spatially arranged in parallel. The docking station, machine and transportable control housing thus comprise complementary plug-type electrical connectors.

The liquid tank may comprise a first fluid path fluidly connecting to the tank, such as (but not limited to) with a first fluid connector and a second fluid path fluidly connecting to the top of the tank, such as (but not limited to) with a second fluid connector. In certain non-limiting embodiments, the first fluid path extends inside the tank body by a tube terminating next to the bottom of the tank body. In certain non-limiting embodiments, the first fluid path also fluidly connects to the bottom of the tank and the second fluid path fluidly connects to the top of the tank. According to the present disclosure, top and bottom of the tank obviously refer to the cavity inside the tank body for fluid or liquid to be received in and in the vicinity of the top or bottom portion thereof.

The first fluid path enables to transport heated liquid from the liquid tank to the beverage dispensing machine such by use of an external liquid pump. It may also be used for supplying air into the liquid for homogenizing liquid temperature in the tank during heating before and/or after transport of liquid in the fluid path ("homogenizing"). The second fluid path may be used for supplying the liquid tank with air (such as by means of an air pump) to maintain the tank under pressure during liquid transport through the first fluid path. The second fluid path can also be used for evacuating or releasing an overpressure from the tank. In certain non-limiting embodiments, the first and second fluid connectors are plug-type connectors. The plug-type connectors also facilitate the connection of the liquid tank to a beverage machine, a docking station or to the transportable housing.

The heating means, optionally the temperature control sensor means, and the first and second fluid paths are, in certain non-limiting embodiments, provided in a lid covering the tank body. As many technical components are integrated in the lid (heater(s), electrical and fluid connector, temperature sensor(s), . . . ), the tank can be kept simple and standard thus allowing for an easy maintenance and cleaning of the tank and guaranteeing a performing insulation.

The lid can further comprise a filling opening. In certain non-limiting embodiments, the filling opening is closeable by a plug means, wherein the plug means can comprise a vent hole. The filling opening has a relatively small cross section. Hence, manual filling of the tank body is facilitated while the insulation characteristics of the tank are not or at most insignificantly affected.

In a particular (but non-limiting) embodiment, the first and second fluid paths are provided in and thus extend through the lid for keeping the tank technology simple and allowing for easy maintenance and cleaning. In certain non-limiting embodiments, the side or end of the first and second fluid paths being opposite to the inside of the tank body comprises first and second fluid connection means, respectively. These fluid connection means are, in certain non-limiting embodiments, auto-obturating in case they are not connected to any kind of external connection means to thus better insulate the inside of the tank body.

In a second aspect, the present disclosure relates to a liquid heating system comprising a mobile liquid tank as aforementioned and a tank receiving device for receiving the tank in a removable manner and having an external or main power electrical connection means for electrically connecting the first heating element to the external power source of low voltage. In a mode, the tank receiving device comprises an air pump, a liquid pump and a control valve for selectively connecting the first fluid path either to the air pump via an air fluid path for filling air into the tank body or to the liquid pump for pumping heated liquid from the tank via a liquid fluid path. In certain non-limiting embodiments, the tank receiving device further comprises a second control unit for operating and controlling the air pump, the liquid pump and the control valve.

The tank receiving device can be an electrical docking station for power recharging of the mobile power source or a mobile beverage dispensing machine. Both solutions are contemplated in different possible embodiments in the present application.

The tank receiving device can comprise a fluid control valve for selectively connecting the first fluid path either with an air pump via an air fluid path for pumping air into the tank via the first fluid path (e.g., in homogenizing mode) or a liquid pump for pumping a liquid to be heated via a liquid fluid path into the tank body via the first fluid path. In particular, for the docking station, the liquid fluid path can, in certain non-limiting embodiments, comprise a liquid connection means being connectable to a liquid source. In certain non-limiting embodiments, the liquid source can be releasably connected to the liquid connection means to supply liquid into the tank. Thus, the liquid tank can be refilled with fresh liquid. Such refilling can be monitored automatically by the control unit as a function of the filling level determined by the temperature control sensor means. It can also be possible that the liquid pump is placed outside the tank receiving device.

The tank receiving device can comprise an independent ("second") control unit. The control unit can be used instead of the control unit of the mobile liquid tank or in addition thereto. In particular, the ("first") control unit of the liquid tank is, in certain non-limiting embodiments, configured for controlling autonomously the heating and sensor means of the tank whether the tank is in standalone configuration or is connected to the tank receiving device. In certain non-limiting embodiments, the control unit of the tank receiving device is configured for controlling the fluidic operations of the liquid heating system. For example, the control valve as well as the air pump and the liquid pump are, in certain non-limiting embodiments, operated and controlled by the control unit of the tank receiving device. Also, charging of the mobile power source by the external power source can be controlled by the control unit the tank receiving device. The second control unit can be further configured to receive input from the first control unit in order to operate. For example, certain steps such as pumping of liquid in or from the tank may be carried as a response to respectively liquid level input or liquid temperature input transferred by the first control unit.

The tank receiving device can comprise a first plug-type fluid connector for releasably connecting its air and liquid delivery fluid path connected to the control valve, the air and liquid pumps to the first fluid connector of the first fluid path of the liquid tank. The tank receiving device further comprises a second plug-type fluid connector open to ambient air and releasably connectable to the second fluid connector of the second fluid path of the liquid tank. Such second connector can serve to allow an overpressure created in the tank to release through the second fluid path.

Hence, a compact device can be provided not only for charging the mobile power source (e.g. a battery), but alternatively or additionally for facilitating the supply of liquid into the tank body and supporting the heating process of the liquid by air introduction to increase the homogenization of the liquid temperature. As mentioned the temperature sensors can also be used as liquid level detectors to allow for an automatic filling of the tank body by the tank receiving device (e.g. docking station).

The tank receiving device can be a mobile beverage dispensing machine. In this case, the first fluid path of the mobile liquid tank is connected to delivery means of the machine for delivering the heated liquid from the tank to a preparation and dispensing means (e.g., a brewing unit for beverage capsules) for preparing a beverage using the heated liquid and dispensing a prepared beverage.

The present disclosure further relates to a trolley or a similar vehicle comprising a liquid heating system of the present disclosure.

In another aspect, the present disclosure relates to a method for heating a mobile liquid using a liquid tank or a liquid heating system according to the present disclosure. The method comprises the steps of:

providing a liquid to be heated in the tank, heating the liquid in the tank to a predetermined temperature by means of the first heating element powered by external power source of low voltage, and maintaining the temperature of the heated liquid substantially constant by means of the first heating element when external power is supplied to the first heating element and by the second heating element powered by the mobile power source of extra-low voltage when external power is no longer supplied by the external power source.

In a particular (but non-limiting) embodiment, the steps of providing and heating the liquid can further comprise the following steps: Opening the liquid fluid path and closing the air fluid path by means of the control valve, delivering liquid into the tank body by means of the liquid pump, closing the liquid fluid path and opening the air fluid path by means of the control valve, heating the liquid in the tank, optionally delivering air from the air pump to the bottom of the tank, in order to accelerate the water homogenisation during heating up of liquid in the tank.

Figure 1B:
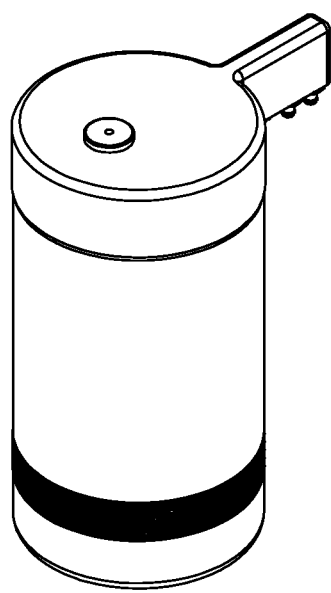
Figure 1C:
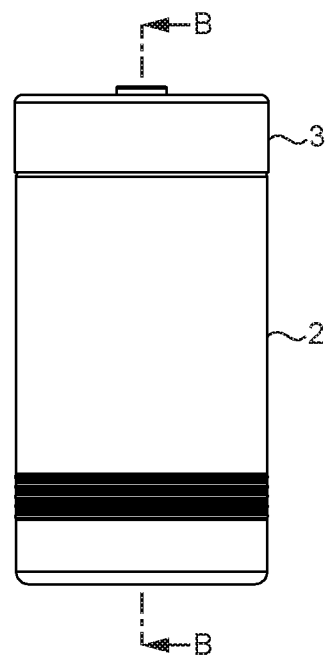

FIG. 1 shows a mobile liquid tank T according to the present disclosure. The tank T comprises an insulated tank body 2 for receiving and storing a liquid 1. The tank body can be made of any suitable material and, in certain non-limiting embodiments, has a two-walled layout having an insulating material—like air—between these two wall portions. The tank body is thus similar to known thermos flasks. The better the insulation quality of the tank or flask, the longer the temperature can be held with a given battery capacity and tank volume. However, the present disclosure is not limited to such a kind of tank bodies.

The tank T further comprises a heating means H for heating the liquid 1 in the tank body 2. Therefore, the heating means H comprises at least one and, in certain non-limiting embodiments, at least two heating elements 17, 18. According to FIG. 1 the heating means H comprises a first heating element 17 for heating up the liquid 1 in the tank T or tank body 2 to a predetermined temperature, such as (but not limited to) the temperature of service. In certain non-limiting embodiments, the temperature corresponds to the temperature of preparation of the beverage. It can typically range from 30 to 95° C. depending on the type of beverage. For example (but not by way of limitation), for coffee extracted from roast and ground coffee, the temperature is comprised between 90 and 95° C. The heating means H further comprises a second heating element 18 for keeping the temperature of the heated liquid 1 in the tank T at a substantially constant value. Therefore, the second heating element 18 is used for compensating nearly 100% of the heat loss in the liquid tank from the predetermined temperature. The first and second elements are typically elements converting electricity into heat through the process of resistive or Joule heating. Electric current passing through the element encounters resistance, resulting in heat being produced. To allow for a reliable heating of the liquid 1, the heating elements extend into the tank body 2 such as (but not limited to) from an upper part—e.g. an upper opening of the tank T—downwards such as (but not limited to) towards a bottom of the tank T inside the tank body 2. In certain non-limiting embodiments, the heating elements end in the vicinity of the bottom of the tank T.

The tank T can further comprise sensor means 19, 20, like temperature control sensor means, provided in the tank T. Like the heating means H, also the sensor means 19, 20 extend, in certain non-limiting embodiments, into the tank T or tank body 2. According to a particular (but non-limiting) embodiment, the sensor means 19, 20 are formed of at least two NTC sensors having different lengths to thus extend at a different depths inside the tank body 2. In particular, a long NTC sensor 19 and a short NTC sensor 20 or equivalent sensors are respectively provided which are both suitable for measuring the temperature of the liquid at two different levels in the tank. A more accurate temperature regulation and/or heating operation can be processed accordingly. For example, above a certain temperature variation, a homogenizing operation of the liquid can be done such by supplying air inside the tank as further described later. Such NTC sensors can also act as liquid level detectors, wherein the longer sensor 19 can be used as low level sensor and the shorter sensor 20 can be used as a full liquid level sensor for indicating the filling level of the tank T, e.g., during filling liquid in the tank or pumping liquid out.

The tank T can further comprise a lid 3 for covering or closing the tank body 2. A sealing means 5 such as a rubber gasket can be provided between the lid 3 and the tank body 2 so that the tank T is sealably closed once the lid 3 is provided on the tank body 2. The sealing means 5 can be designed such that the lid 3 can be attached to the tank body 2 by a press-fitting connection. In certain non-limiting embodiments, the lid is of thick plastic (either fully solid or filled with foam) for efficient insulation.

In certain non-limiting embodiments, the lid 3 comprises a filling opening 50 which is, in certain non-limiting embodiments, closeable by a plug 4 which can comprise a vent hole or valve 51 enabling fluid equilibrium inside the tank during liquid dispensing. The plug 4 can be made of rubber and the like. Since real level indicators can hardly be used in a mobile liquid tank T without prejudice to insulation, and since any opening including the filling opening 50 and vent 51 should be as small as possible in order to reduce the temperature loss, the use of the NTC sensors is an advantage for accurately measuring the filling level in the tank.

In certain non-limiting embodiments, the heating elements 17, 18 and/or the temperature control sensor means 19, 20 are all connected to the lid 3 such that they extend from the lid 3 in a way to be positioned inside the tank body 2. The relative positions of these means inside the tank are thus automatically and constantly set by connection of the lid to the tank body.

Figure 2A:
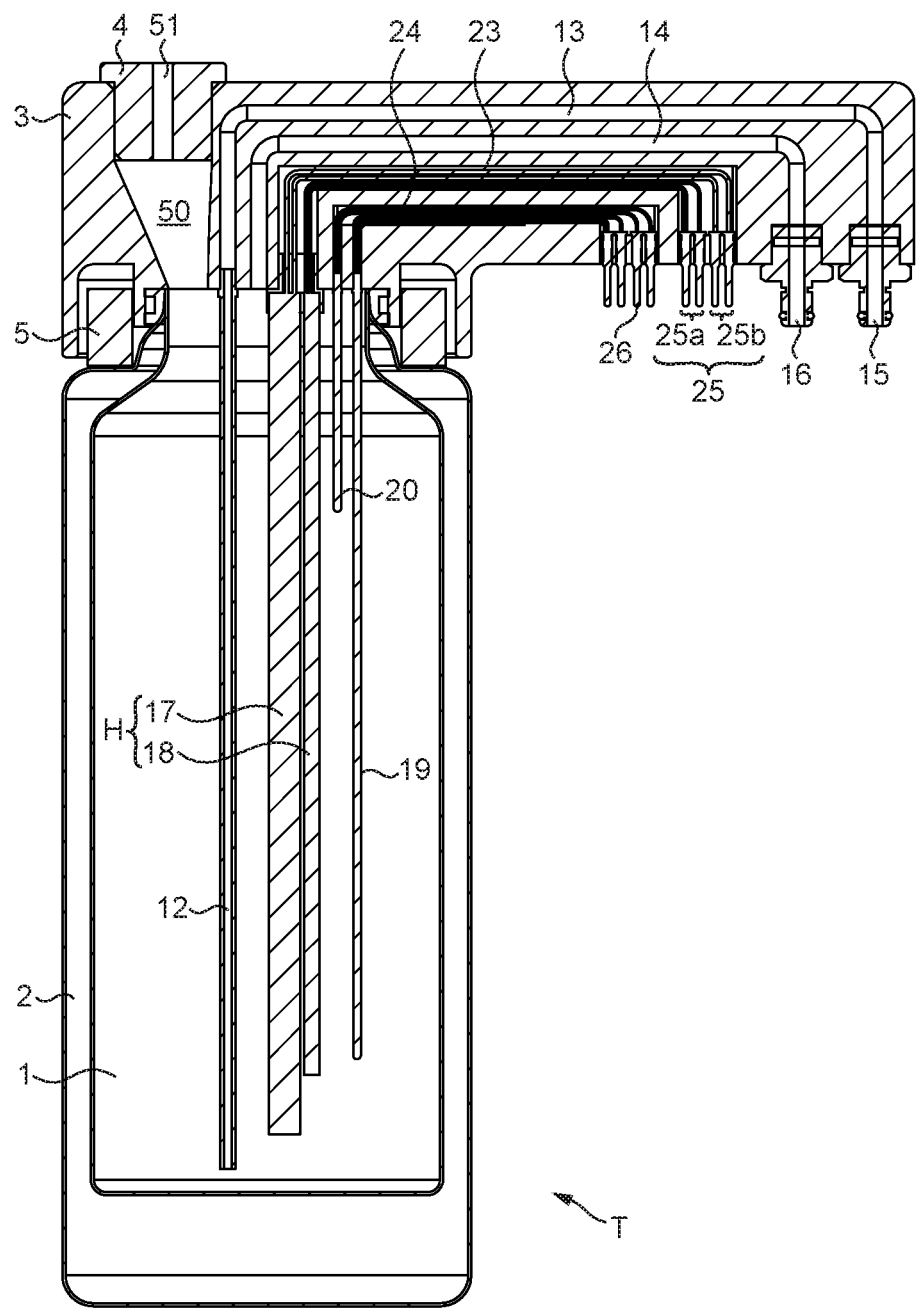
FIG. 2(*a-c*) shows a mobile liquid tank according to a second embodiment of the present disclosure.
Figure 2B:
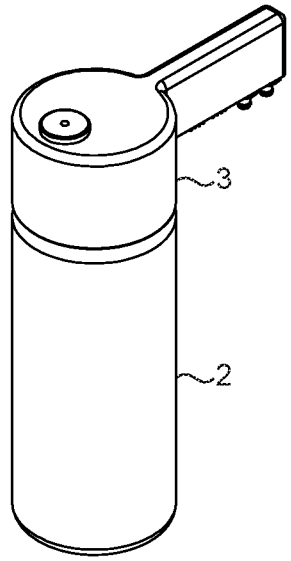
Figure 2C:
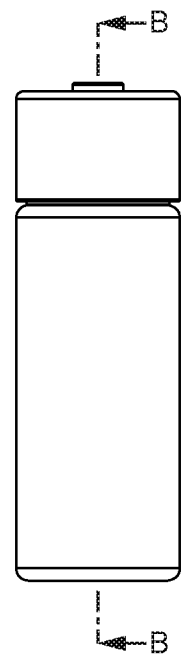
Figure 3A:
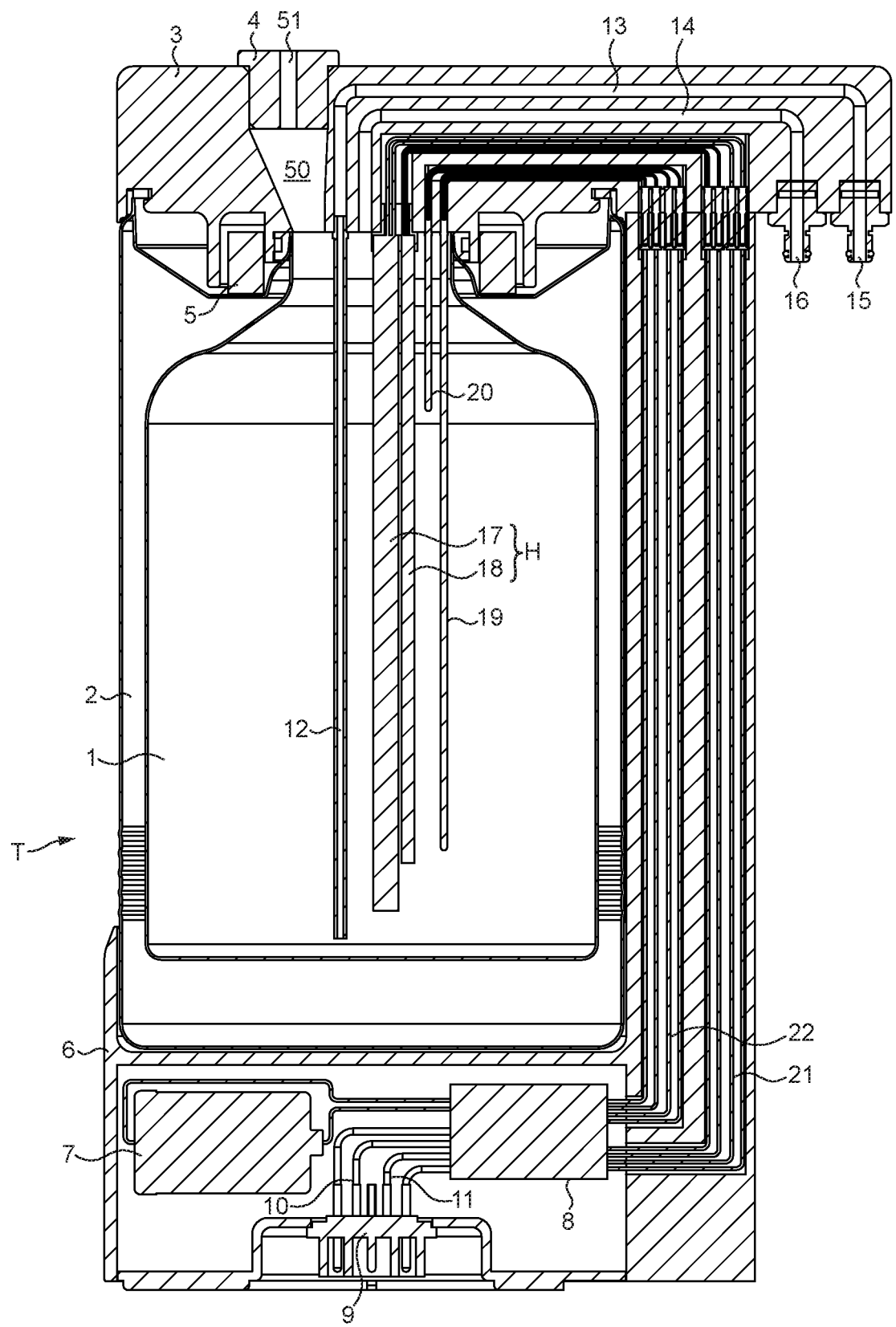
FIG. 3(*a-c*) shows a mobile liquid tank according to FIG. 1 as well as a separate housing having a mobile power source, a main power connection means and a control unit.
Figure 3B:
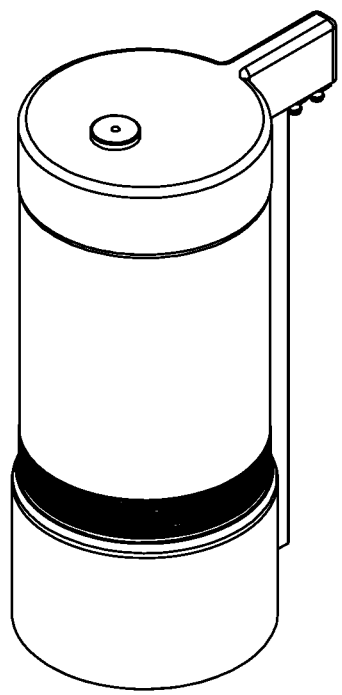
Figure 3C:
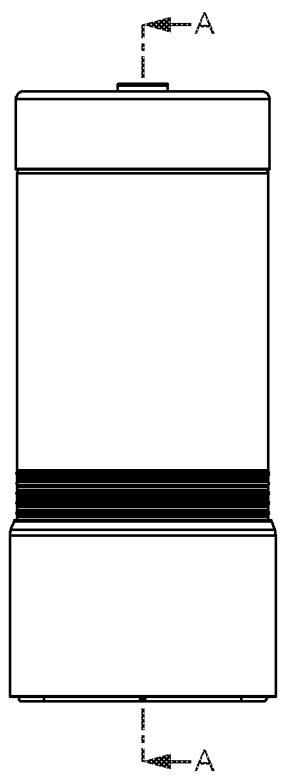

According to a particular (but non-limiting) embodiment of the present disclosure, the tank T can further comprise a first fluid path 13 fluidly connecting the bottom of the inside of the tank T to a fluid connector 15 and a second fluid path 14 fluidly connecting a top of the inside of the tank T to a second fluid connector 16. Both connectors 15, 16 are open to ambient air when the tank is in a standalone configuration as illustrated in FIG. 1, 2 or 3. To allow the first fluid path 13 to reach down to the bottom of the tank T, the fluid path extends in the form of a tube 12 into the tank T towards the bottom of tank body 2. In a particular (but non-limiting) embodiment, the first and second fluid paths 13, 14 are desirably provided in and thus extend through the lid 3. A part of the first fluid path 13 extending down to the bottom of the tank T can be provided as a separate tube 12 which can be releasably plugged into the lid 3 to form the first fluid path 13.

In certain non-limiting embodiments, first and second fluid connectors 15, 16 are self-closing when they are not complementarily plugged with external connectors to better insulate the content of the tank T. For this, each connector may comprise an integrated shut-off valve. In certain non-limiting embodiments, each connector is of a plug-type for which connection is obtained without tool and by simple press-fitting engagement. The connector typically comprises a male or female press-fit portion and a seal member such as a rubber gasket attached thereto. The connectors are positioned in parallel and at a same directional level so enabling a press-fitting engagement all at once with a tank receiving device.

According to the present disclosure, the first heating element 17 is configured to be connectable to an external power source. The external power source is a low voltage power source such as 110 or 230 VAC. The second heating element 18 is configured to be connectable to a mobile power source 51 of a mobile tank receiving device (M) as, for instance, depicted in FIG. 6. The mobile power source is an extra-low voltage power source such as a battery delivering 12 or 24 VDC. The mobile power source is, in certain non-limiting embodiments, electrically rechargeable. Examples of rechargeable batteries can be: flow battery, fuel cell, lead-acid battery, lithium, molten salt, nickel, sodium, potassium, silver, silicone-air and combinations thereof.

According to the embodiment of FIG. 1, such a connection can be obtained by two parallel sets of electrical cables 23 of the respective heating element 17, 18 extending, in certain non-limiting embodiments, through the lid 3 to connection means 25 formed by two electrical connectors 25a, 25b (each one linked to one heating element) being accessible from an outside of the tank T. In certain non-limiting embodiments, the connectors are also identical and placed at the same directional level each other (and optionally to the fluid connectors 15, 16 too) to facilitate plugging with complementary electrical connectors of a tank receiving device or control housing.

Alike, the temperature control sensor means 19, 20 can also comprise two sets of electrical cables 24 extending, in certain non-limiting embodiments, through the lid 3 to a corresponding electrical connection means 26 formed by two connectors 26a, 26b; each one linked to one sensor.

Hence, in order to keep the tank T technology simple, in certain non-limiting embodiments, all these fluid and electrical flow means are integrated in or connected to the lid 3 thus allowing for an easy maintenance and cleaning.

FIG. 2 shows a second embodiment of the mobile liquid tank T according to the present disclosure which is similar to the tank T according to the first embodiment of FIG. 1 but having a smaller tank body 2 (i.e. of smaller liquid storage capacity and footprint) and a correspondingly adapted lid 3.

FIG. 3 illustrates a third embodiment of a mobile liquid tank T according to the present disclosure. To avoid unnecessary repetition, the technical characteristics described and illustrated in relation to the previous embodiments can be used as well for the present embodiment. According to this embodiment, the tank T further comprises a housing 6 for receiving control means in particular a control unit 8. The control unit 8 is configured to control and operate the first heating element 17 by external power to heat up the liquid 1 in the tank T in case the first heating element 17 is connected to an external low voltage power source. The control unit 8 is further configured to control and operate the second heating element 18 by power of a mobile extra-low voltage power source 7 to substantially keep constant the temperature of the heated liquid in the tank T when the first heating element 17 is no longer connected to the external power source. As mentioned already, the mobile power source is an extra-low voltage power source such as a battery delivering 12 or 24 VDC. The mobile power source is, in certain non-limiting embodiments, electrically rechargeable. Examples of rechargeable batteries can be: flow battery, fuel cell, lead-acid battery, lithium, molten salt, nickel, sodium, potassium, silver, silicone-air and combinations thereof. The temperature of the heated liquid can be kept constant by means of the first heating element 17 as long as the external power is supplied and then by the second heating element 18 powered by the mobile power source 7 when the external power is no longer supplied. The mobile power source or battery can be housed inside the housing 6 thereby making the liquid tank T easily transportable while guaranteeing the heating continuity and maintenance of the suitable liquid temperature at all time.

As a possible operation the control unit 8 may also operate the heating element 18 to at least partially heat up the liquid in case the tank T is (accidentally or voluntarily) unplugged from the external power source before the liquid had reached the predetermined and desired temperature. This operation can be optional and its implementation may be subjected to temperature conditions such as a minimal temperature threshold reached by the liquid heated by the first heating element.

Figure 4A:
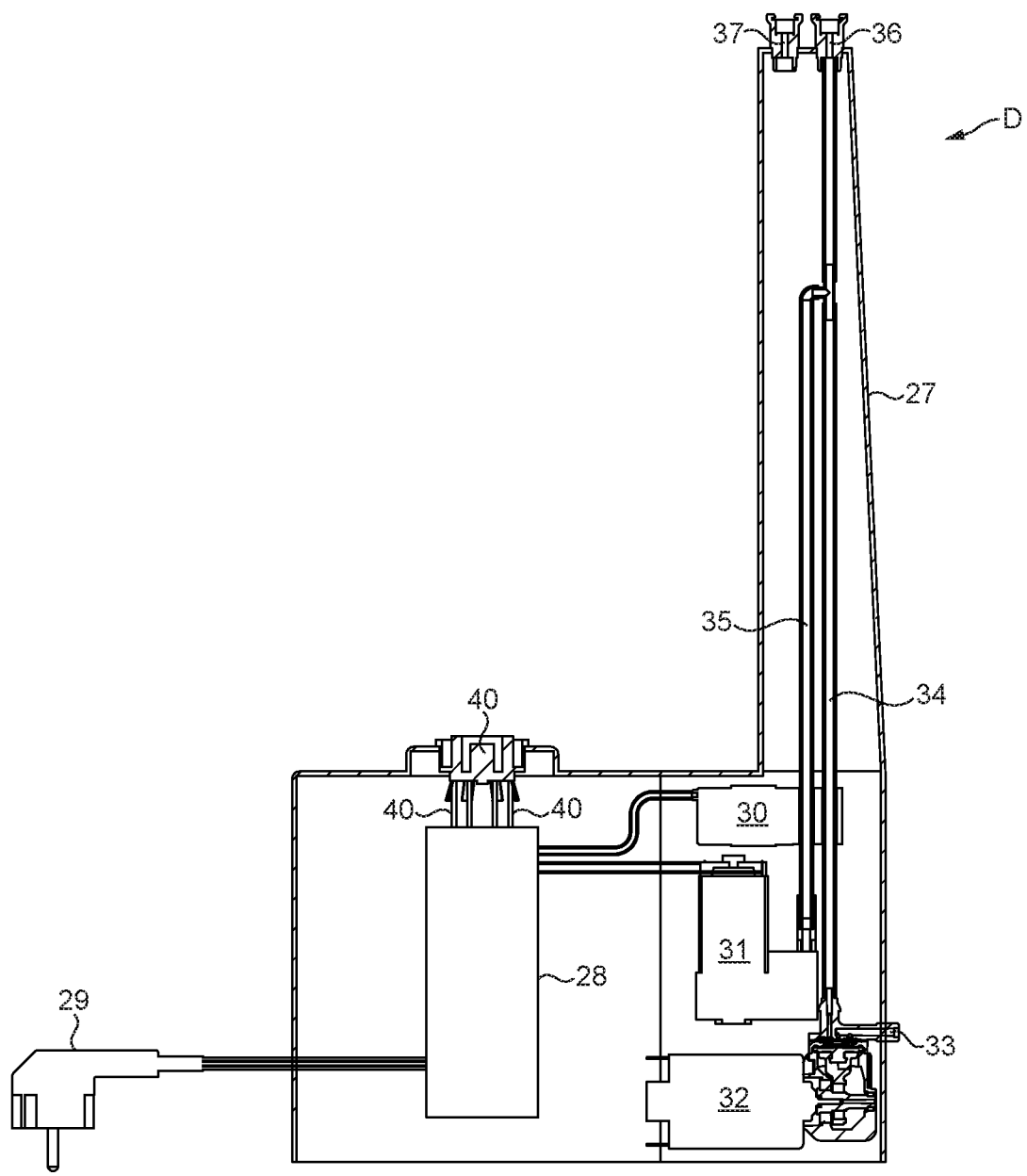
FIG. 4(*a-c*) shows a docking station according to the disclosure.
Figure 4B:
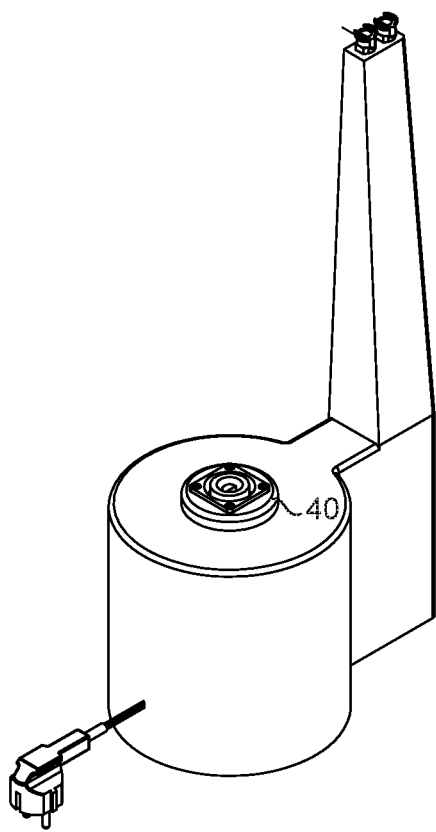
Figure 4C:
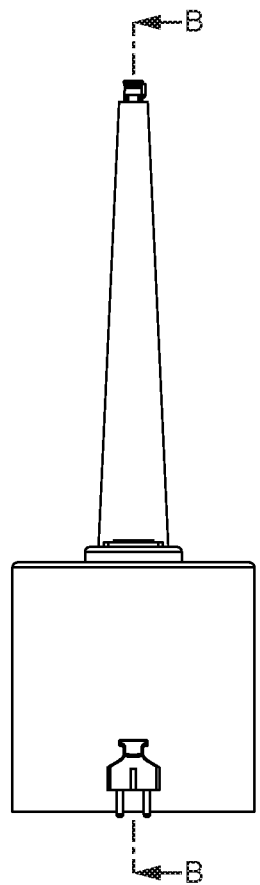

The tank T can further comprise an external power supply connector 9 which is connected by cables 10, 11 to the first heating element 17, such as (but not limited to) via the control unit 8. The mains or external power supply connector means 9 is thereby connectable to an external power source; either directly or via a tank receiving device D, M for receiving the tank T as will be described herein below. In certain non-limiting embodiments, the power supply connector 9 is a cordless connector arranged to engage with a base connector of an external base unit. The base connector 40 can be integrated to the tank receiving device as illustrated in FIG. 4. This connecting assembly (e.g. Strix control) is widely used such as for water kettles and does not need to be further described. In such configuration, the control unit 8 can be further configured to recharge the mobile power source 7 using the external power through the external power supply connector 9.

To allow for an automatic temperature control, the temperature control sensor means 19, 20 can be connected to the control unit 8 and the measured temperature data received from the sensor means can be used as input for controlling the heating means H.

Figure 10A:
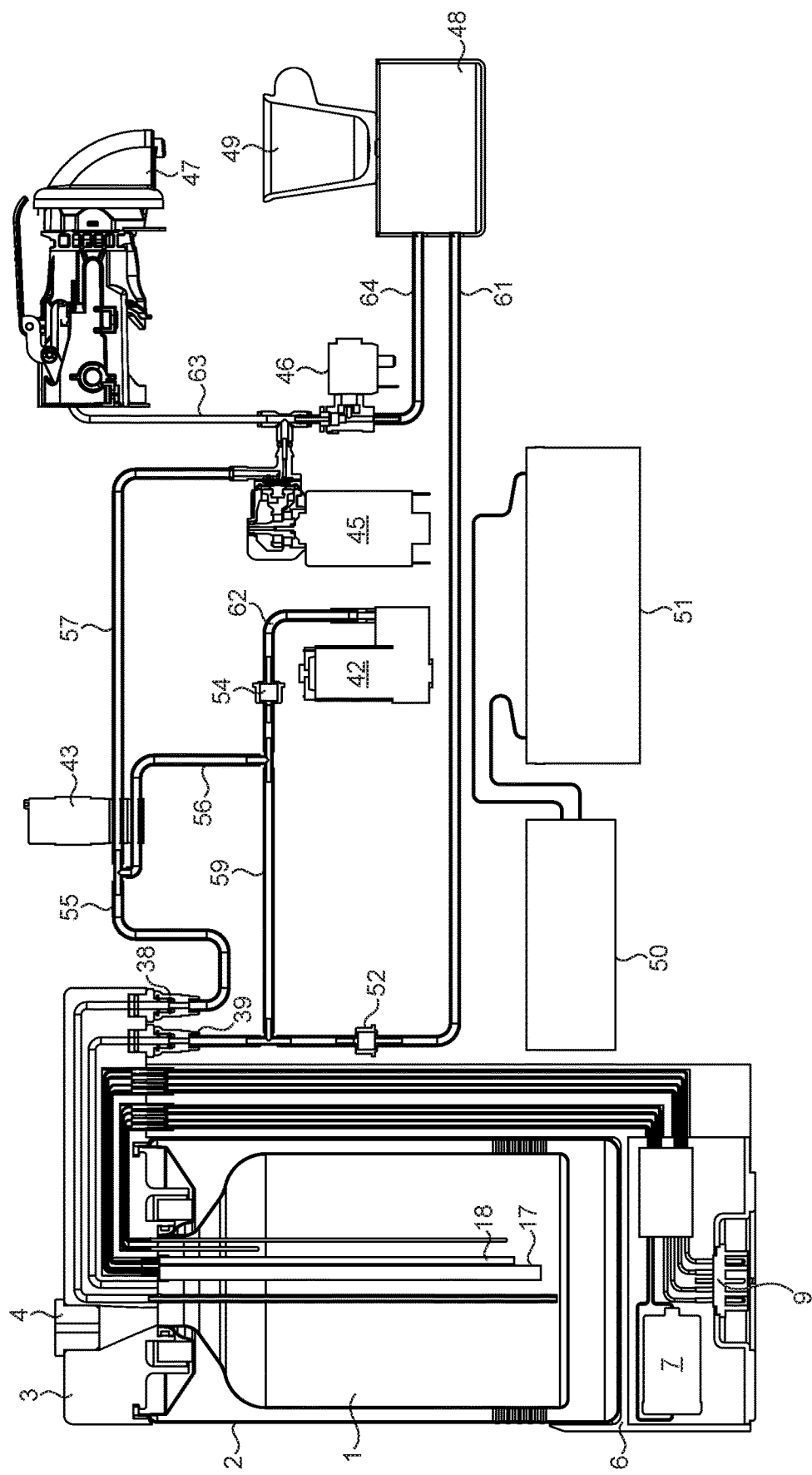
FIG. 10(*a-b*) comprises a liquid heating system according to a sixth embodiment of the present disclosure having a mobile liquid tank according to FIG. 3.
Figure 10B:
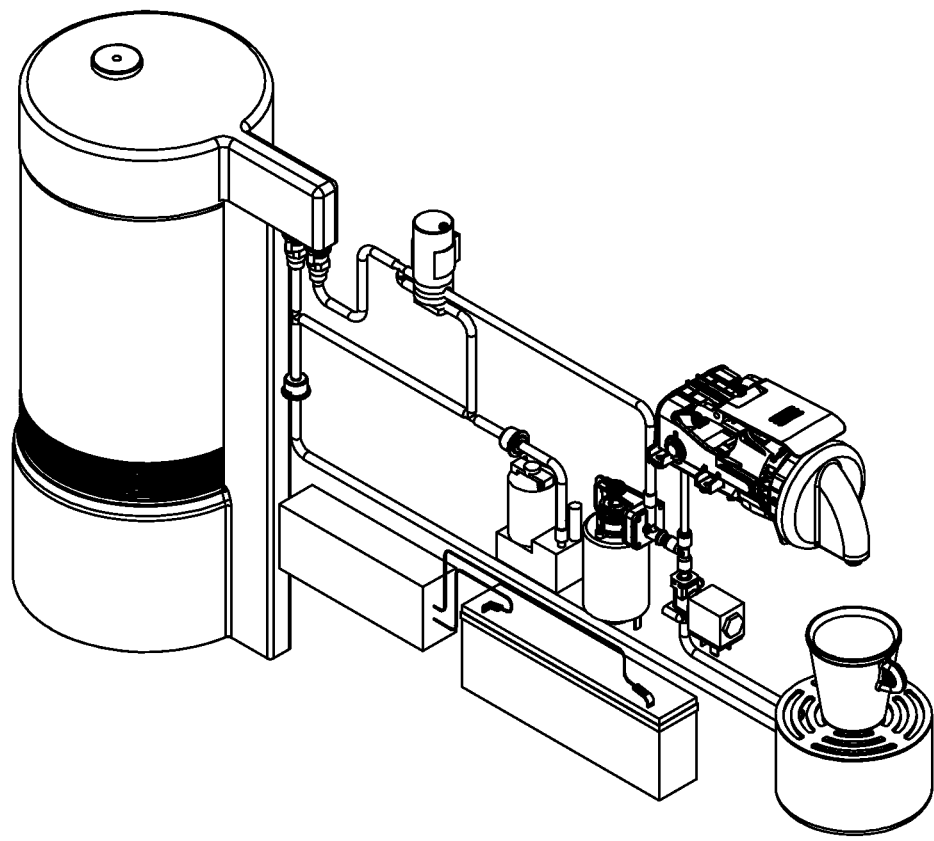
Figure 11A:
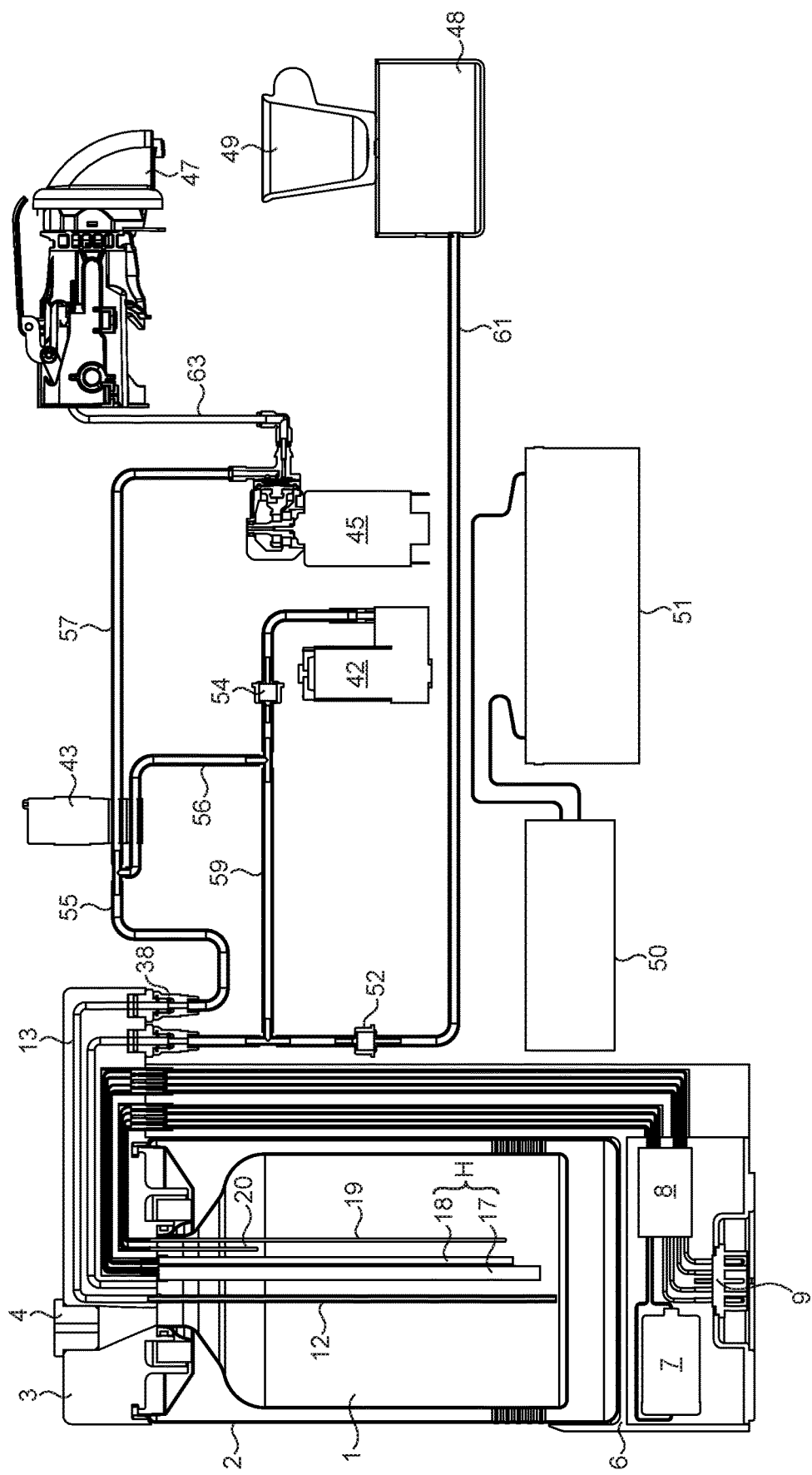
FIG. 11(*a-b*) shows a liquid heating system according to a seventh embodiment of the present disclosure.
Figure 11B:
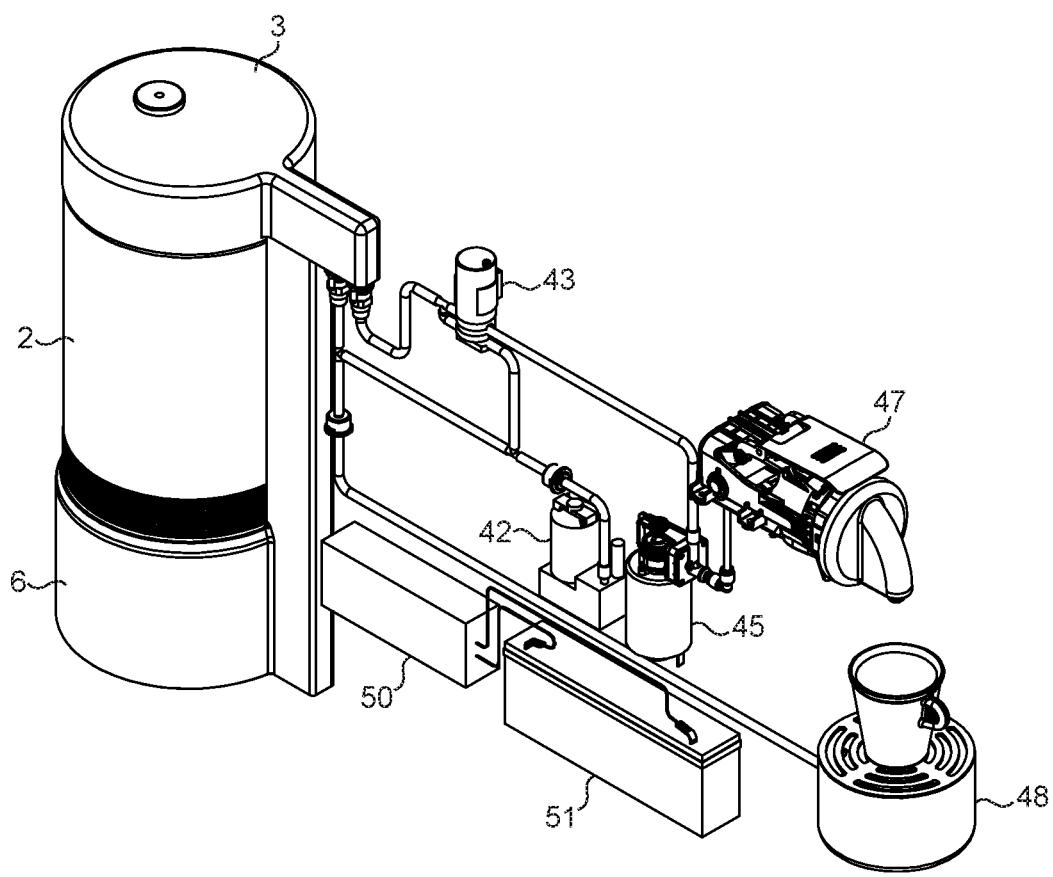

According to the embodiment of FIG. 3, the mobile power source 7, the external power supply connectors 9 and the control unit 8 are provided in a separate housing 6 which can be releasably attachable to the tank body 2. The attachment of the housing can be obtained by way of by way of male or female electrical connectors complementary to female or male electrical connectors 25, 26. Additional mechanical attaching means can be provided if necessary such as a threading or an anchoring mechanism. The separate housing 6 can form a support for the tank body as shown in FIG. 3 but it can also be a housing of a mobile beverage dispensing machine as shown in FIGS. 10 and 11, or the like. In certain non-limiting embodiments, the separate housing 6 can be designed such that the tank body 2 can be placed thereon in only one predefined position in particular as defined by the position of the electrical connectors 25, 26.

When the housing 6 is connected with the liquid body 2 by more permanent connection means such as screws, rivets and/or welding or is integrally formed with it, the separate electrical connectors 25, 26 can be avoided and the heating means H and temperature sensor means 19, 20 can be directly connected to the control unit 8 via electrical cables 21, 22.

In the following, different embodiments of liquid heating systems are described. It should be noted that many other variants are possible which can combine different characteristics of these embodiments.

In general, a liquid heating system S according to the present disclosure comprises a mobile liquid tank T according to the present disclosure and a tank receiving device D, M having a main or low voltage power electrical connector 29 for electrically connecting the first heating element 17 or the external power supply connector 9 with an external low voltage power source. The power supply connection means or the external power electrical connector according to the present disclosure can be any kind of electrical connection means, such as (but not limited to) a main power plug which can be used to plug the system to an external power source for heating up the liquid and/or charging the mobile battery source 7, 51.

Figure 5A:
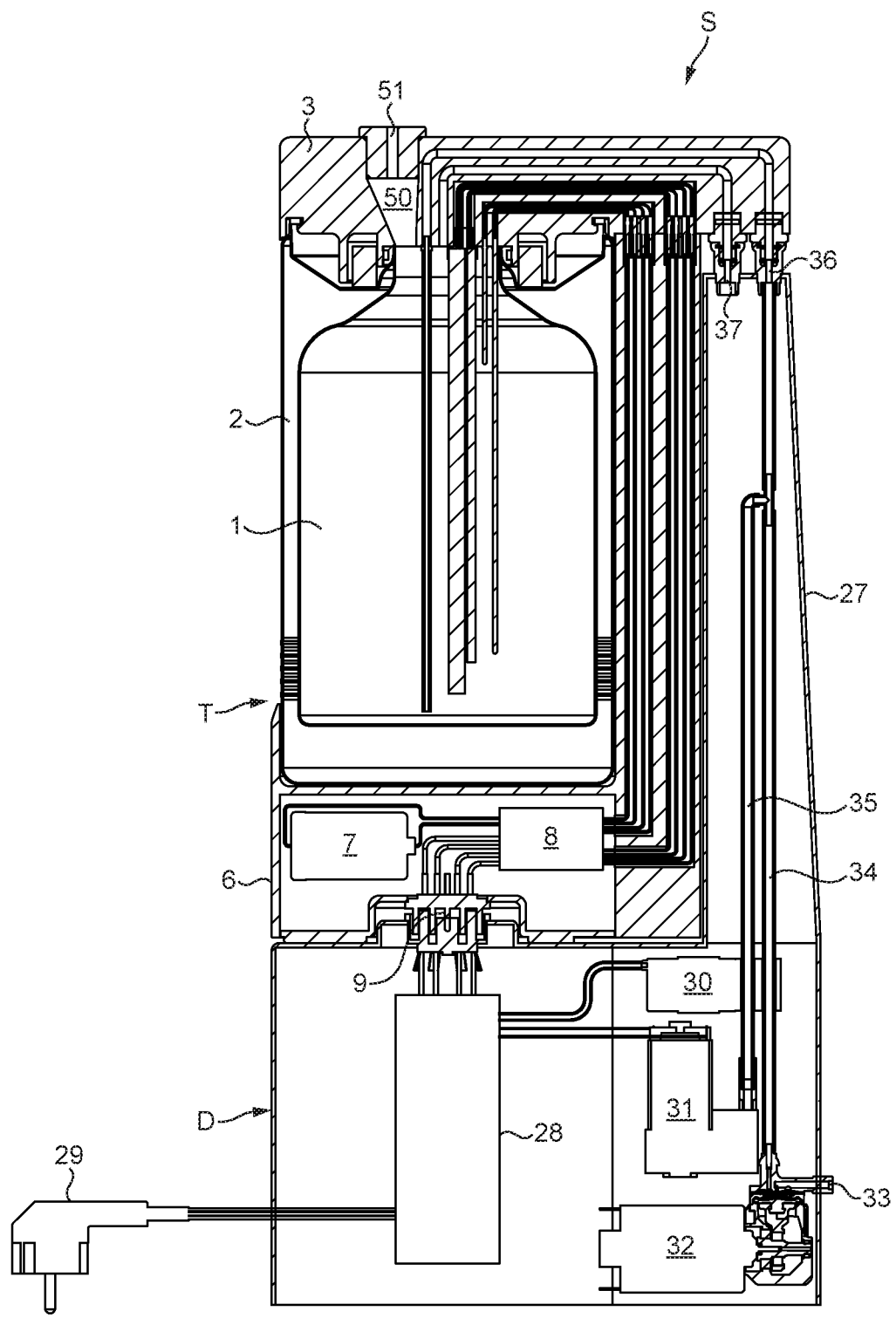
FIG. 5(*a-c*) shows a liquid heating system according to a first embodiment of the present disclosure having a mobile liquid tank according to FIG. 3 and a docking station according to FIG. 4.
Figure 5B:
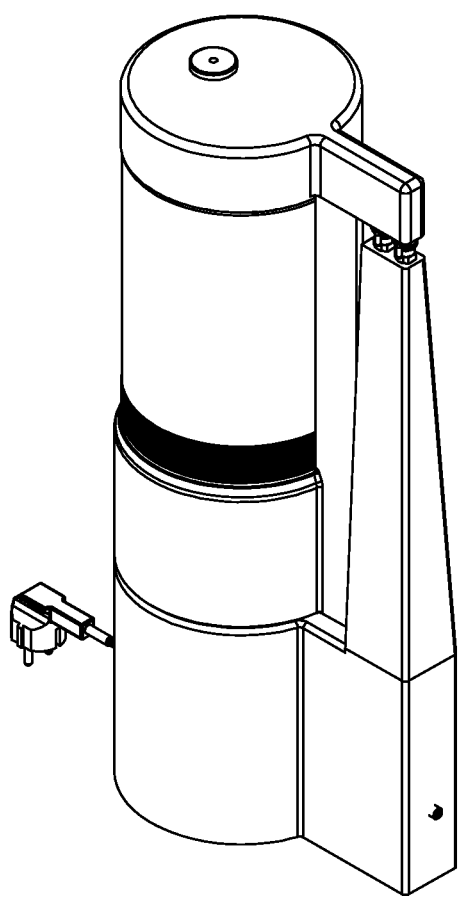
Figure 5C:
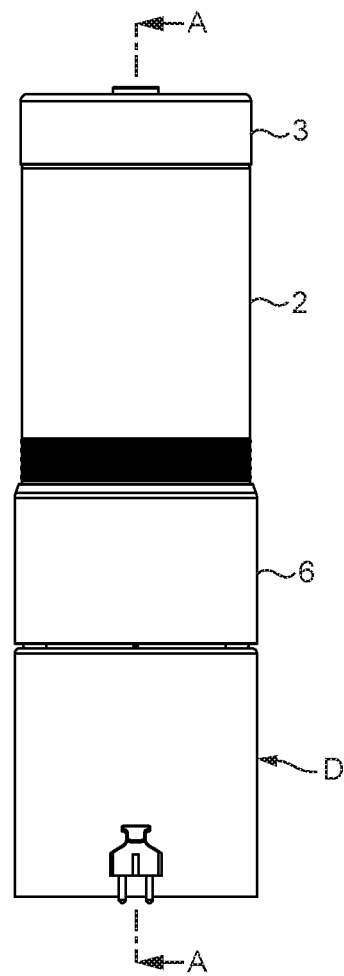

In view of FIGS. 4 and 5, a tank receiving device can be a docking station D. The tank T can be electrically connected with the docking station D and thus indirectly to the external power (via the main power electrical connection means 29) by means of an electrical connector 40 which, in certain non-limiting embodiments, is designed such that electrical connection between the docking station D and the tank T (or separate housing 6) is automatically obtained by simply placing the tank T on the docking station D. Such electrical connector can be a cordless connector base as described earlier.

According to a particular (but non-limiting) embodiment, the docking station D comprises a control valve 30 for selectively connecting the first fluid path 13 either within an air pump 31 via an air fluid path 35 for pumping air into the tank body 2 via the first fluid path 13, or a liquid pump 32 for pumping a liquid to be heated via a liquid fluid path 34 into the tank body 2 via the first fluid path 13. In certain non-limiting embodiments, the liquid fluid path 34 comprises a liquid connector 33 which is connectable to an external liquid source like a tap or another kind of liquid supply. In a general manner applicable to the control valve 30 and any other similar ones of the present disclosure, such valve is designed to engage in opening with two fluid paths alternatively. Such control valve encompasses any other designs in which the valve is constituted of two separate or independent valves and controlled alternatively by the control unit.

According to a particular (but non-limiting) embodiment, the docking station D desirably comprises a second control unit 28 for operating and controlling the control valve 30, the air pump 31 and the liquid pump 32. It is noted that the control unit 28 can also be used—in addition or alternatively to the first control valve 8—to charge the battery 7 and to operate and control the heating means H as well as the temperature control sensor means 19, 20.

In certain non-limiting embodiments, the docking station D can further comprise a (third) fluid connection means 36 for releasably connecting an air/liquid (i.e. fluid) delivery fluid path to the first fluid connector 15 of the first fluid path 13. The air/liquid delivery fluid path is the system comprising the control valve 30, the air and liquid pumps 31, 32 as well as the air and liquid fluid paths 34, 35. The docking station D may further comprise a (fourth) fluid connector 37 open to ambient air and releasably connectable to the second fluid connector 16 of the second fluid path 14. Such last connector enables the safe release of an overpressure in the tank.

All the components of the docking station D can be housed in a housing 27 of the docking station D.

In the following, a method for heating a liquid using a mobile liquid tank T according to the present disclosure or a liquid heating system S according to the present disclosure will be described. Such a method mainly comprises the steps of providing a liquid 1 to be heated in the tank T, heating the liquid 1 in the tank T to a predetermined temperature by means of the first heating element 17 powered by external power, and keeping the temperature of the heated liquid 1 by means of the heating means H (such as, but not limited to, the first heating element 17) when external power is supplied or the second heating element 18 powered by the mobile power source 7 when external power is not supplied (e.g. when the main power electrical connection means 29 is unplugged).

In certain non-limiting embodiments, the steps of providing and heating the liquid 1 may comprise the following steps:

In the docking station, the liquid fluid path 34 can be opened and the air fluid path 35 can be closed by means of the control valve 30 operated by its control unit 28. Liquid 1 can be filled in the tank body 2 by means of the liquid pump 32 from an external source of fresh liquid such as a tap or a water dispenser. In certain non-limiting embodiments, fresh liquid 1 is filled into the tank T until the upper NTC sensor 20 detects a full level status of the tank T. Then the liquid pump 32 is stopped. The first heating element 17 can be switched on to start heating up the liquid 1 in the tank T. The liquid fluid path 34 can be closed and the air fluid path 35 can be opened by means of the control valve 30. Optionally air can be delivered from the air pump 31 via the first fluid path 13, 12 to the bottom of the tank T. Such introduction of air in the tank is, in certain non-limiting embodiments, carried out during the heating of the liquid 1 in the tank T in order to avoid or reduce a temperature gradient in the tank during the heating step. Overpressure can be evacuated through the second fluid path 14 and the open fluid connector 37. At the end of the heating process to the predetermined temperature—such as (but not limited to) measured by the temperature sensor means 19, 20—has been reached, the first heating element 17 can be switched off. The air pump 31 can also be switched off. The tank T is now ready for an operation on a mobile machine M as will be described in the following. As long as the tank T remains on the docking station D and the station is connected to the mains, the temperature of the liquid 1 is remains regulated with the first heating element 17 but once the heating element 17 stops being supplied by the external power source, for example, by removing the tank from the docking station D, the mobile power source takes over and supplies the second heating element 18 that becomes automatically active and regulated by the control unit 8 of the tank.

The heating method can be carried out automatically and can be for example initiated by pushing a start button (not shown). The mobile power source can be charged whenever the tank T is docketed and connected to an external power source. The detection of low voltage power received by the control unit 8 can automatically trigger the switchover from the "autonomous energy supply" mode to the "assisted energy supply" mode.

According to the present disclosure, the liquid heating system S can also comprise, instead of a docking station D, as described before, a mobile beverage dispensing machine M (e.g. see FIGS. 6 to 11) as the tank receiving device. In this case, the first and second fluid paths 13, 14 are, in certain non-limiting embodiments, connected to and thus form part of a delivery means of the machine M for delivering the heated liquid 1 from the tank T to a preparation and dispensing means 47 for preparing a beverage using the heated liquid 1 and dispensing a prepared beverage. In case of a mobile beverage dispensing machine M, the mobile power source and/or the control unit can be a mobile power source 51 and/or control unit 50 of the respective machine M as will be described herein below with respect to FIGS. 6 to 11.

According to the present disclosure, also the mobile beverage dispensing machine M as such comprising—as a part of the mobile beverage dispensing machine M—the liquid tank T as will be described herein below forms part of the present disclosure.

Figure 6A:
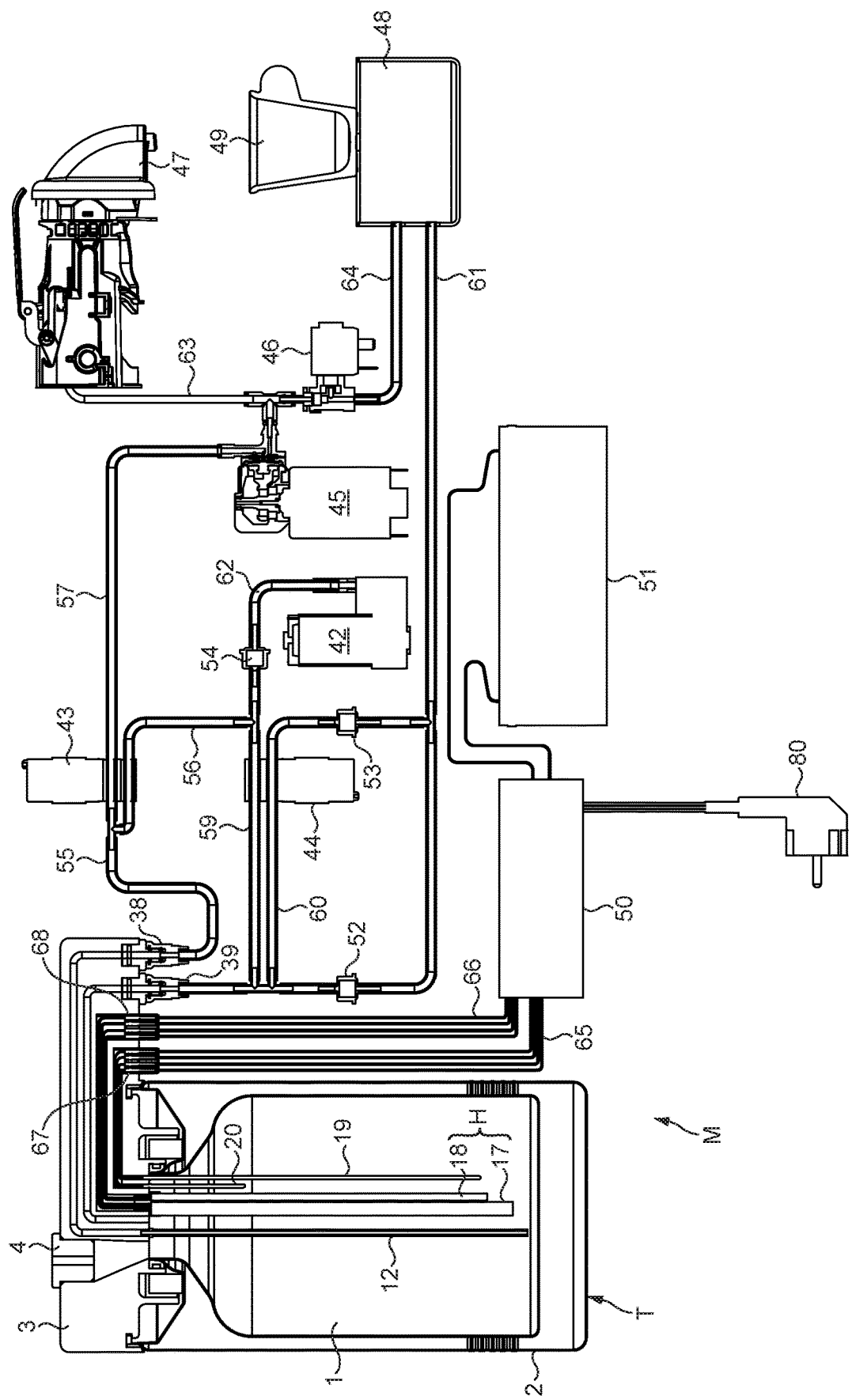
FIG. 6(*a-b*) shows a liquid heating system according to a second embodiment of the present disclosure having a mobile liquid tank according to FIG. 1.
Figure 6B:
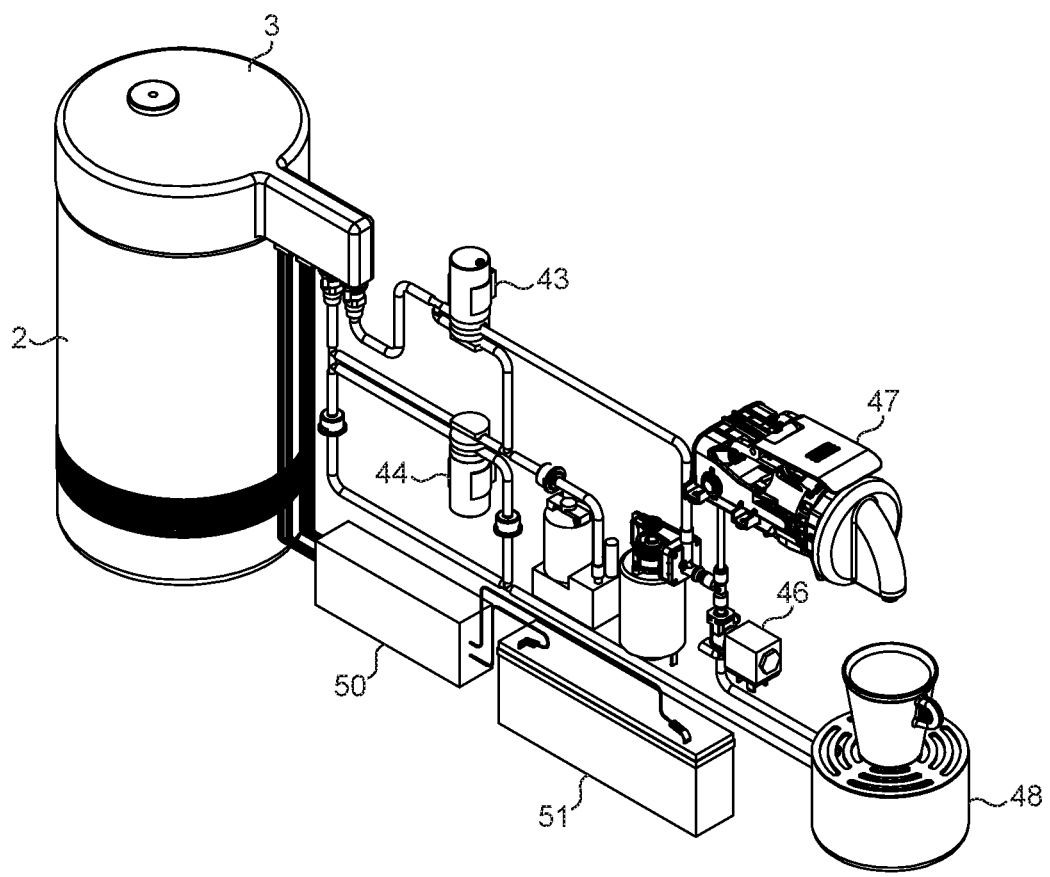

Such a mobile beverage dispensing machine M according to the present disclosure comprises a liquid tank T as described herein above and also depicted in FIGS. 1, 2 and 3. In FIG. 6 a liquid tank T as depicted in FIG. 1 is shown. The liquid tank T thus has a thermally insulated tank body 2 for receiving and storing the liquid 1 used for preparing a beverage. The machine M further comprises the preparation and dispensing means 47 for preparing a beverage using the liquid 1 and dispensing the prepared beverage. Such preparation and dispensing means 47 are well-known in the prior art so that a detailed explanation is not necessary. It is noted, however, that such preparation and dispensing means 47 can, for instance, be a brewing unit adapted to receive a capsule containing a beverage ingredient to be extracted like roast and ground coffee or tea.

The machine M further comprises a liquid delivery means for delivering the liquid 1 from the tank T to the preparation and dispensing means 47. Such a delivery means can be designed in many different ways. For instance, the delivery means generally comprises at least one or a plurality of fluid paths—like tubes or conduits—to deliver a fluid like the (heated) liquid or air.

The machine M further comprises heating means H for heating the liquid 1 in the tank T. Such heating means H are already described before. It is, however, noted that according to the present disclosure the heating means H do not necessarily comprise two physically separated heating elements 17, 18 but the heating elements 17, 18 can also be formed as a single member. For example, the second heating element 18 can be a resistive wire which is coiled around the first heating element 17 forming a main rod-type resistance.

The machine M further comprises a main or external power supply connector 80 connectable to an external power source for operating the heating means H, and a mobile power source 51 for operating the heating means H. According to a principle of the present disclosure, the heating means H comprises the first heating element 17 and the second heating element 18, wherein the first heating element 17 is configured to be connectable to an external power source and the second heating element 18 is connected or connectable to the mobile power source 51.

The machine M further comprises a control unit 50 which—like the control unit 7—is configured to control and operate the heating means H in particular the first heating element 17 by external power to heat up the liquid 1 in the tank T when the main power supply connection means or heating element H is connected to the external power source. The control unit 50 is further configured to control and operate the heating means H, in particular the second heating element 18 by power of the mobile power source 51 to substantially keep constant the temperature of the heated liquid in the tank T when the main power supply connection means or the first heating element 17 is no longer connected to the external power source.

Accordingly, the mobile power source 51 can be, example (but not by way of limitation) a rechargeable, battery. In a particular (but non-limiting) embodiment, the battery or mobile power source 51 is a mobile power source for operating the machine M. In this case, there is no need for an additional mobile power source 7 as describe herein above. In this regard, it is also noted that the control unit 50 of the machine M can be used in addition or, in certain non-limiting embodiments, alternatively to the control unit 8 of the liquid tank T as, for instance, described in respect of FIG. 3. The control unit 8 of the tank T can thus be omitted. When the control unit 8 is still present, it can be dedicated for the heating regulation of the liquid in the tank.

The machine M may further comprise temperature control sensor means 19, 20 as already described herein above which are provided in the tank T. In certain non-limiting embodiments, the temperature control sensor means 19, 20 are connected to the control unit 50 either of the machine M or of the tank T so that the measured data received from the sensor means 19, 20 can be used as input for controlling the heating means H via the control unit 50 or control unit 8 if any.

As already described above, the tank T can be releasably provided in/on the machine M. In this case, the tank T can be fluidly connected with the liquid delivery means of the machine M by means of the fluid connectors 15, 16 on the tank T side as well as the fluid connectors 38, 39 on the liquid delivery means side. Moreover, if the heating means H are to be powered by or via the machine M, the heating means H can be electrically connected with the main power supply connectors of the machine M and the mobile power source 51—such as (but not limited to) via the control unit 50—and, if provided, the temperature control sensor means 19, 20 can be connected with the control unit 50 by means of electrical connectors 25, 26 on the tank T side and electrical connectors 67, 68 on the machine M side. The electrical connection means 25, 26 67, 68 can be designed as matching male/female connectors. The electrical connectors 67, 68 can be connected to the control unit 50—or electrical connectors 68 also directly to the main power supply connection means and/or mobile power source 51—via electrical cables 65, 66.

In the following, a few embodiments of the mobile beverage dispensing machine M according to the present disclosure are described and in particular a few embodiments regarding the liquid delivery means thereof.

As shown in the embodiment of FIG. 6, the liquid delivery means can comprise a first fluid path 13, 55, 57, 63 fluidly connecting a bottom of the tank T with the preparation and dispensing means 47; i.e. extending therebetween. The machine M may further comprise a second fluid path 61 fluidly connecting a top of the tank T with ambient air; i.e. extending therebetween. In certain non-limiting embodiments, the second fluid path 61 comprises a check valve 52 allowing overpressure in the tank T to escape to ambient air via the second fluid path 61.

The first fluid path 55 and/or the second fluid path 61 can be connected with a third fluid path 56, 59. In case the third fluid path 56, 59 connects both the first fluid path 55 and the second fluid path 61, the delivery means further comprises a first control valve 43 which is, in certain non-limiting embodiments, controlled by the control unit 50 for selectively closing the first fluid path 57 such that the connection between the bottom of the tank T and the preparation and dispensing means 47 is closed, or the third fluid path 56 such that the connection between the bottom of the tank T and the third fluid path via the first fluid path 55 is closed.

The machine M may further comprise an air pump 42, such as (but not limited to) in the third fluid path 56, 59. In certain non-limiting embodiments, the air pump 42 is connected to the third fluid path 56, 59 via a fifth fluid path 62 desirably comprising a check valve 54 to avoid low pressure reaching the air pump 42. The air pump 42 is provided and configured such that it can fill air into the tank T either via the first fluid path 55 or via the second fluid path 61. In certain non-limiting embodiments, the air pump 42 is controlled by the control unit 50 of the machine.

The delivery means may further comprise a fourth fluid path 60 bypassing the first check valve 52 of the second fluid path 61. In certain non-limiting embodiments, the fourth fluid path 60 comprises a second check valve 53 desirably opening at a pressure of about 0 bar. In certain non-limiting embodiments, the delivery means can then further comprise a second control valve 44, desirably also controlled by the control unit 50, for selectively closing the third fluid path 59 such that the connection between the air pump 42 and the second fluid path 61 is closed, or the fourth fluid path 60 is closed.

According to a particular (but non-limiting) embodiment, a liquid pump 45 is provided in the delivery means, for example (but not by way of limitation) in the first fluid path 57, and in a particular (but non-limiting) example, between the first control valve 43 and the preparation and dispensing means 47. The liquid pump 45 is provided and configured such that it can pump the liquid 1 from the tank T to the preparation and dispensing means 47. Also, in certain non-limiting embodiments, the liquid pump 45 is controlled by the control unit 50. The liquid pump 45 can be a pump chosen for providing a low pressure of liquid for example 1-4 bar, for example, for preparation of tea, herbal tea, hot chocolate or filter coffee or high pressure for example 5 bar and up to 20 bar for coffee such as ristretto, espresso, lungo and the like. The pump can be a membrane pump for which the pressure can be actively changed by the control unit. The pump can also be a solenoid piston pump.

The delivery means can further comprise a third control valve 46 which is also, in certain non-limiting embodiments, controlled by the control unit 50. In certain non-limiting embodiments, the third control valve 46 is positioned downstream the liquid pump 45 in the first fluid path 63 for selectively opening a drainage fluid path 64 closing the drainage fluid path 64. In certain non-limiting embodiments, the drainage fluid path 63 is open to ambient air at an end opposite to the first fluid path 57, 63.

According to the embodiment of FIG. 6, the second fluid path 61 and/or the drainage fluid path 64 are fluidly connected to a drip tray 48 of the preparation and dispensing means 47. In certain non-limiting embodiments, the drip tray 48 is positioned vertically below the preparation and dispensing means 47. The drip tray 48 can also be designed such that a container 49 like a cup can be positioned thereon to be disposed vertically below the preparation and dispensing means 47 for receiving the dispensed beverage.

In the following, a method for preparing a beverage using the mobile beverage machine M according to the present disclosure will be described. Said method comprises the steps of providing a liquid 1 for preparing a beverage in the tank T. In certain non-limiting embodiments, this is done directly on the machine M, e.g. via the top filling opening 50 or via the docking station D when the tank is connected beforehand. The method further comprises the steps of connecting the main power supply connection means of the machine M to an external power source, heating the liquid 1 in the tank T, for example (but not by way of limitation) to a predetermined temperature, by means of the heating means H, in particular the first heating element 17 powered by the external power, keeping the temperature of the heated liquid 1 substantially constant by means of the heating means H, for example (but not by way of limitation) the first heating element 17 when external power is supplied or the second heating element 18 powered by the mobile power source 51 when external power is no longer supplied, and delivering heated liquid 1 via the delivery means to the preparation and dispensing means 47 for preparing and dispensing a beverage in/from the preparation and dispensing means 47.

The heating step of the method according to the present disclosure may further comprise the following steps: the bottom of the tank T can be connected with the air pump 42 for example (but not by way of limitation) by closing the first fluid path 57 to the preparation and dispensing means 47 and opening the third fluid path 56 to the first fluid path 55 via the first control valve 43. In this state, the fourth fluid path 60 is opened and the third fluid path 59 is closed via the second control valve 44. The second fluid path 61 via the second control valve 44 is so opened. The fluid path comprising the check valve 52 remains closed because of an opening pressure set above 1 bar (e.g. at 1.8 bar). Air can be delivered from the air pump 42 to the bottom of the tank T when switching on the air pump 42. The air pump 42 can thus be used to inject air into liquid 1 in the tank during heating to thus mix the liquid for a better temperature homogenization.

Overpressure can escape via the second and fourth fluid paths 61, 60 as well as via check valve 53 opening at a pressure of below 1 bar. Optionally, the fourth fluid path 60 can be closed and the third fluid path 59 can be opened via the second control valve 44 once the predetermined temperature is reached. Hence, check valve 52 can regulate a potential (predefined) overpressure, such as (but not limited to) of above 1 bar (e.g. 1.8 bar). The temperature can be kept constant via the heating means H, wherein the power of operating the heating means H is provided by the mobile power source 50 at least once the main power supply connection means is disconnected from the external power source.

The delivery step of the method for preparing a beverage according to the present disclosure may further comprise the following steps: the first fluid path 57 can be closed to the preparation and dispensing means 47 and the third fluid path 56 can be opened to the first fluid path 55 via the first control valve 43. Optionally, the fourth fluid path 60 can be closed and the third fluid path 59 can be opened to the second fluid path 61 via the second control valve 44. Air can be delivered into the tank T by using the air pump 42 to create an overpressure in the tank T. The third fluid path 56 can be closed to the first fluid path 55 and the first fluid path 57 can be opened via the first control valve 43. Liquid 1 can be delivered from the tank T through the first fluid path 13, 55, 57 up to the delivery pump 45 to prime it. Priming of the pump may be necessary to overcome cavitation effect due to hot liquid supplied to the pump. When the delivery pump 45 is primed, liquid can be delivered at high pressure through fluid path 63 and to the preparation and dispensing means 47. However, as air is desirably (but not by way of limitation) delivered to a top portion of the tank T by the air pump 42 via the second fluid path 14, a small overpressure can be applied to the inside of the tank body 2 so that the liquid 1 will be pushed out of the tank T via the first fluid path 12, 13 even without the support of the liquid pump 45. The present disclosure thus also proposes a method to empty the tank T without opening the lid 3, while just using an air pump 42 to push the liquid 1 out of the tank T for example (but not by way of limitation) through the lid 3. This also allows for pumping the liquid 1 without pump contact to the liquid 1 and thus helps reducing a contamination and scale problems of the liquid 1, tank T and delivery means. Apart from the avoidance of a temperature gradient in the tank, the air pump 42 can thus also be used to push the liquid 1 out of the tank T and via the first fluid path 13, 55, 57, 63 to the preparation and dispensing means 47 to prepare a beverage. However, the liquid pump 45 facilitates the liquid delivery and allows for applying high pressure required for beverage preparation such as coffee extraction, e.g., for espresso-style coffee, and can thus be alternatively or additionally used.

Optionally, the third control valve 46 can be opened for a predetermined time (e.g. about 1 second or about 10 ml) to connect the first fluid path 13, 55, 57 and the drainage fluid path 64 to allow unheated liquid to escape into the drip tray 48. The drainage fluid path 64 thus allows for an evacuation of liquid into drip tray 48 which can be useful to divert initial too cold liquid—e.g. liquid 1 which remained in the delivery means between two operations of the machine M—into drip tray 48 before the heated liquid 1 is delivered to the preparation and dispensing means 47 by switching the third control valve 46 to thus closing the drainage fluid path 64 and opening the first fluid path 63.

Heated liquid can be delivered from the first fluid path 13, 55, 57, 63 to the preparation and dispensing means 47. A beverage can be prepared using the heated liquid 1 and dispensing the prepared beverage for example (but not by way of limitation) in a container 49. Finally, the air pump 42 and the liquid pump 45 can be switched off and the first fluid path 57 can be closed to the preparation and dispensing means 47 and the third fluid path 56 can be opened via the first control valve 43.

At the end of the process, the preparation of the beverage is stopped or terminated by switching off the liquid pump 45 as well as the air pump 42, opening the third fluid path 56 and closing the first fluid path 57 to the preparation and dispensing means 47. As the fluid connection means 38, 39 are now physically linked, the remaining liquid in the delivery means flows back into the tank T due to pressure equilibrium. This significantly reduces temperature losses in the tank T since no cooling liquid column remains in/through the lid 3.

As will be apparent from the following description of FIGS. 7 to 11, the delivery means can be laid out in many different ways while the embodiments as described herein are only considered to be exemplary embodiments.

Figure 7A:
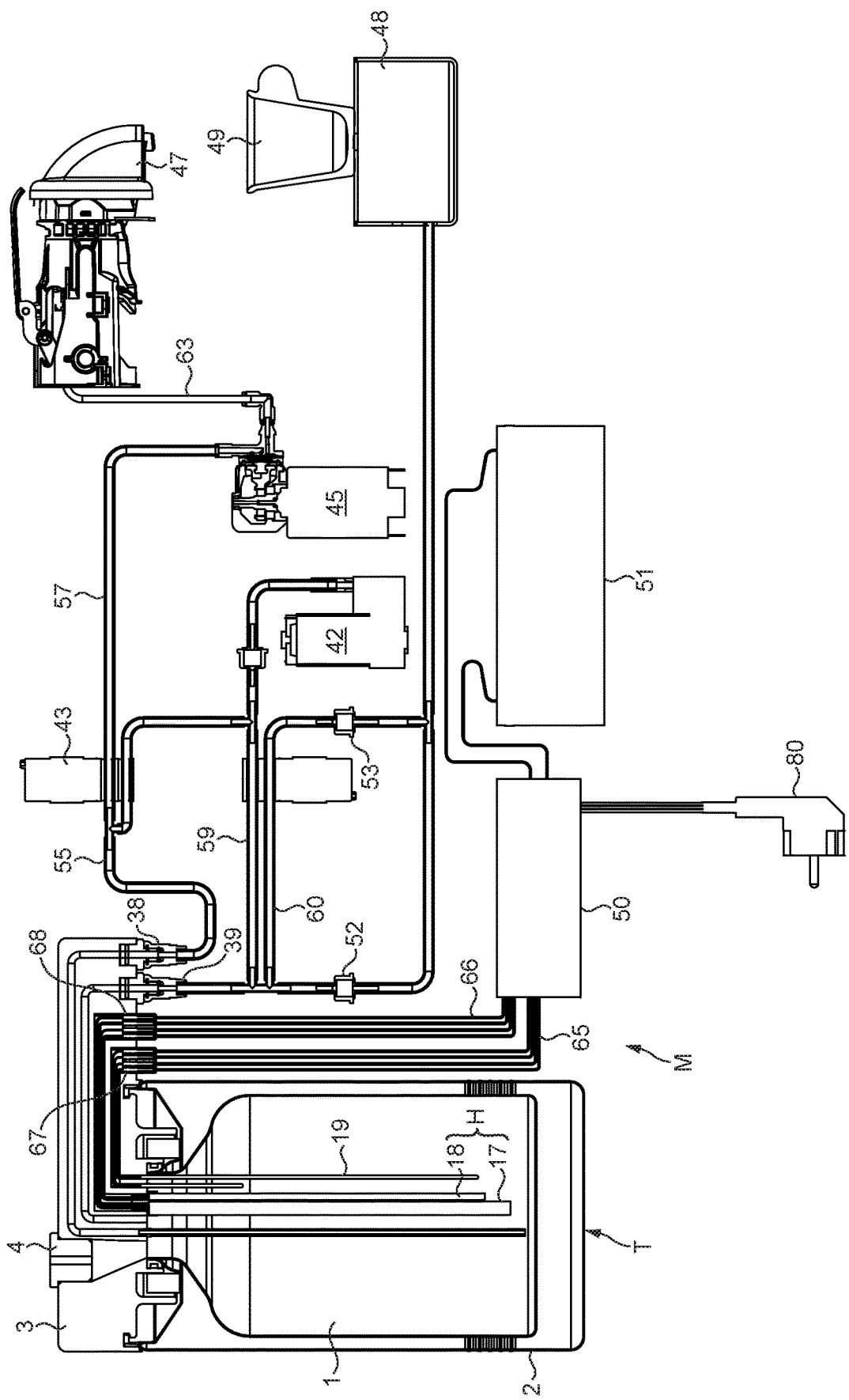
FIG. 7(*a-b*) shows a liquid heating system according to a third embodiment of the present disclosure.
Figure 7B:
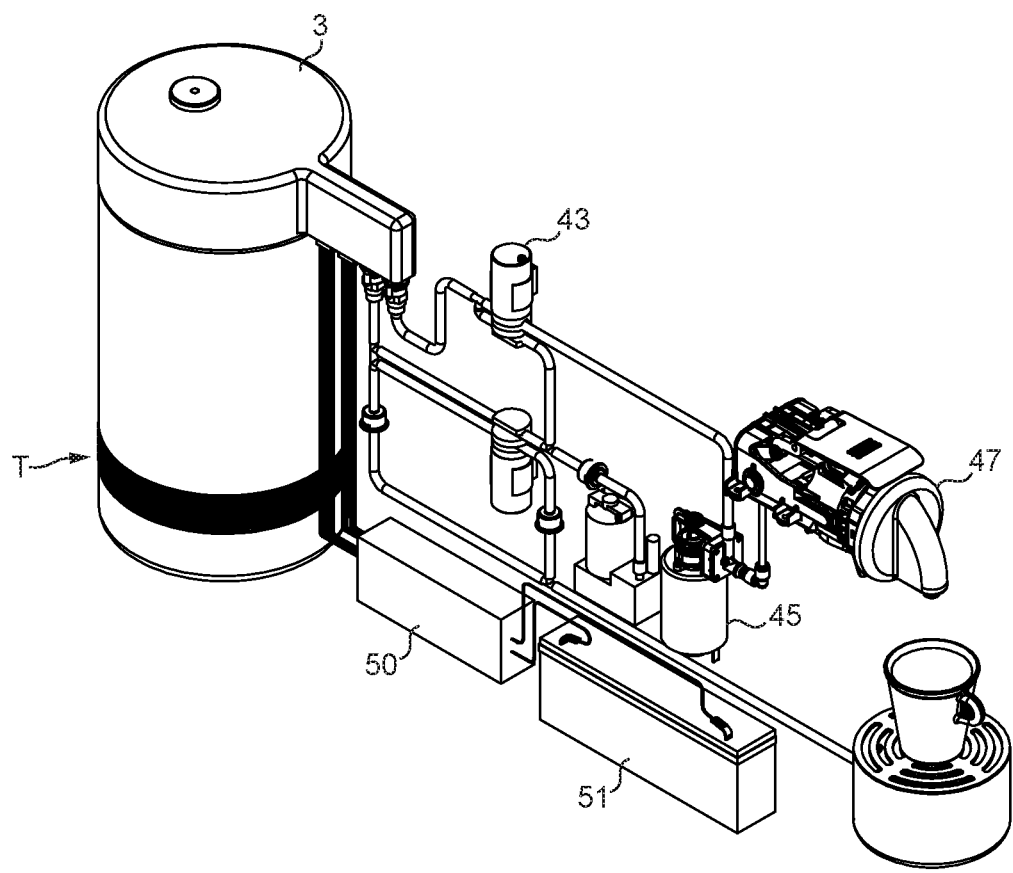

FIG. 7 shows another embodiment of the mobile beverage dispensing machine M which is similar to the machine M according to FIG. 6 but without the control valve 46 and drainage 64. Such a machine M can be used if the initial beverage preparation temperature is less sensitive or the delivery means (e.g. the first fluid path 57) are very short so that an effect of a potential unheated liquid with respect to the overall amount of the dispensed beverage is negligible.

Figure 8A:
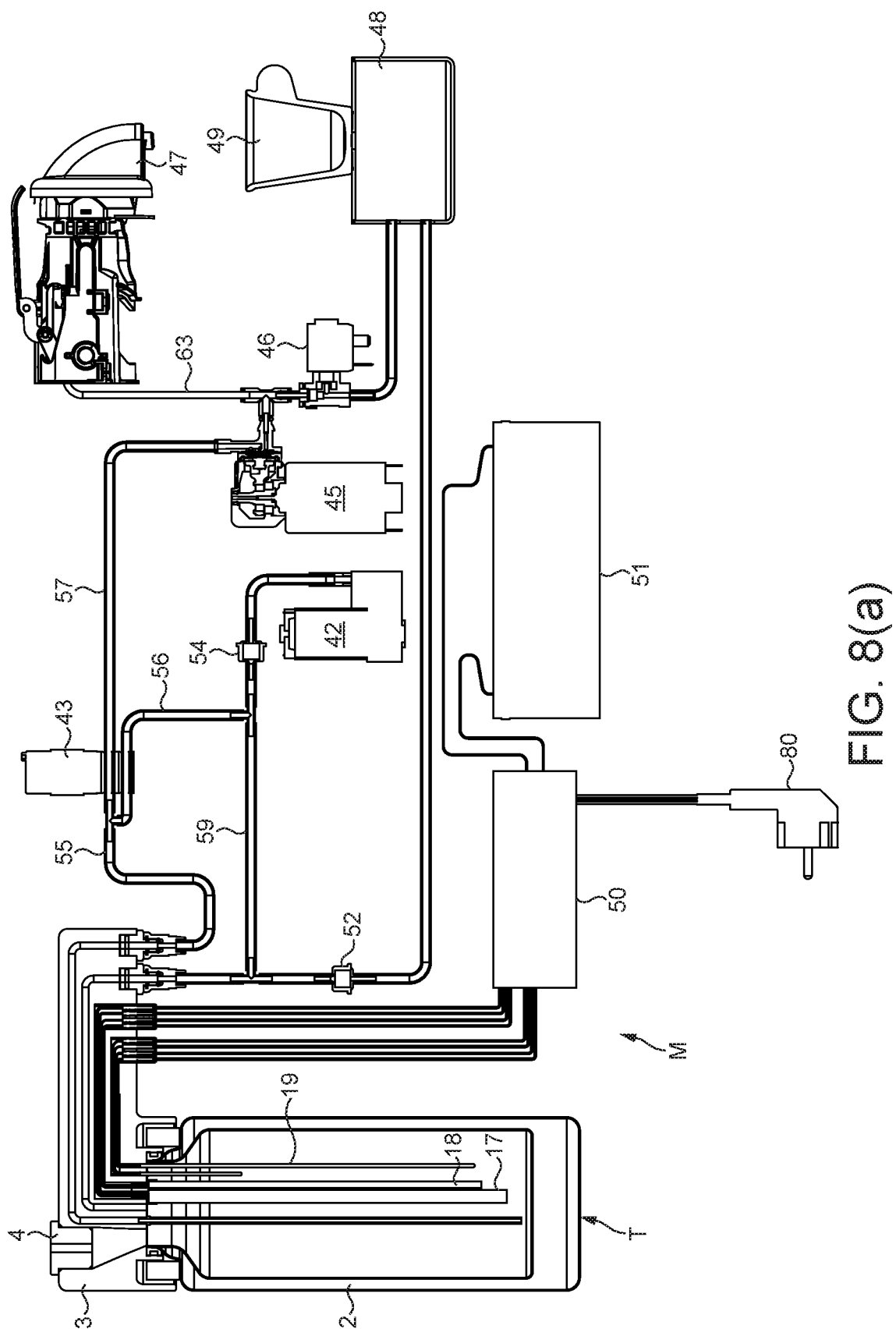
FIG. 8(*a-b*) shows a liquid heating system according to a fourth embodiment of the present disclosure and having a mobile liquid tank according to FIG. 2.
Figure 8B:
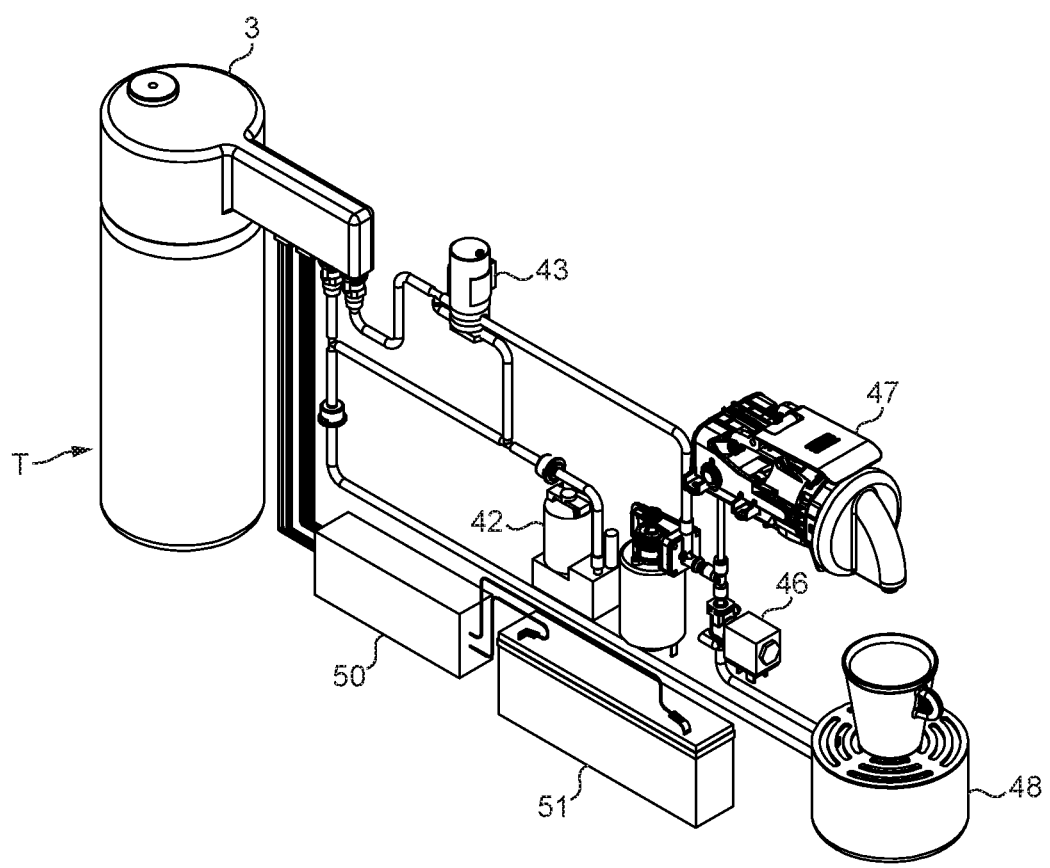

FIG. 8 shows a machine M having, for instance, a smaller tank T as also depicted in FIG. 2. In case of small tanks T (e.g. below one liter) an air liquid mixing in the tank T during the main heating using the heating means H (the first heating element 17) and external power source is not necessarily required so that in this case control valve 44, check valve 53 as well as the fourth fluid path 60 are not needed and can thus be omitted. The shown tank T (see also FIG. 2) as well as the tank T according to FIGS. 1 and 6 are for example (but not by way of limitation) aimed to be stationary on the mobile machine M so that there is no need for integrating the mobile power source 7 and electronic pack 8 to 11, 21, 22 as these features are integrated in the mobile machine M for example (but not by way of limitation) at its bottom. Therefore, the electrical connections for the heating means H and the sensor means 19, 20 are for example (but not by way of limitation) made by the electrical connectors 25, 26.

Figure 9A:
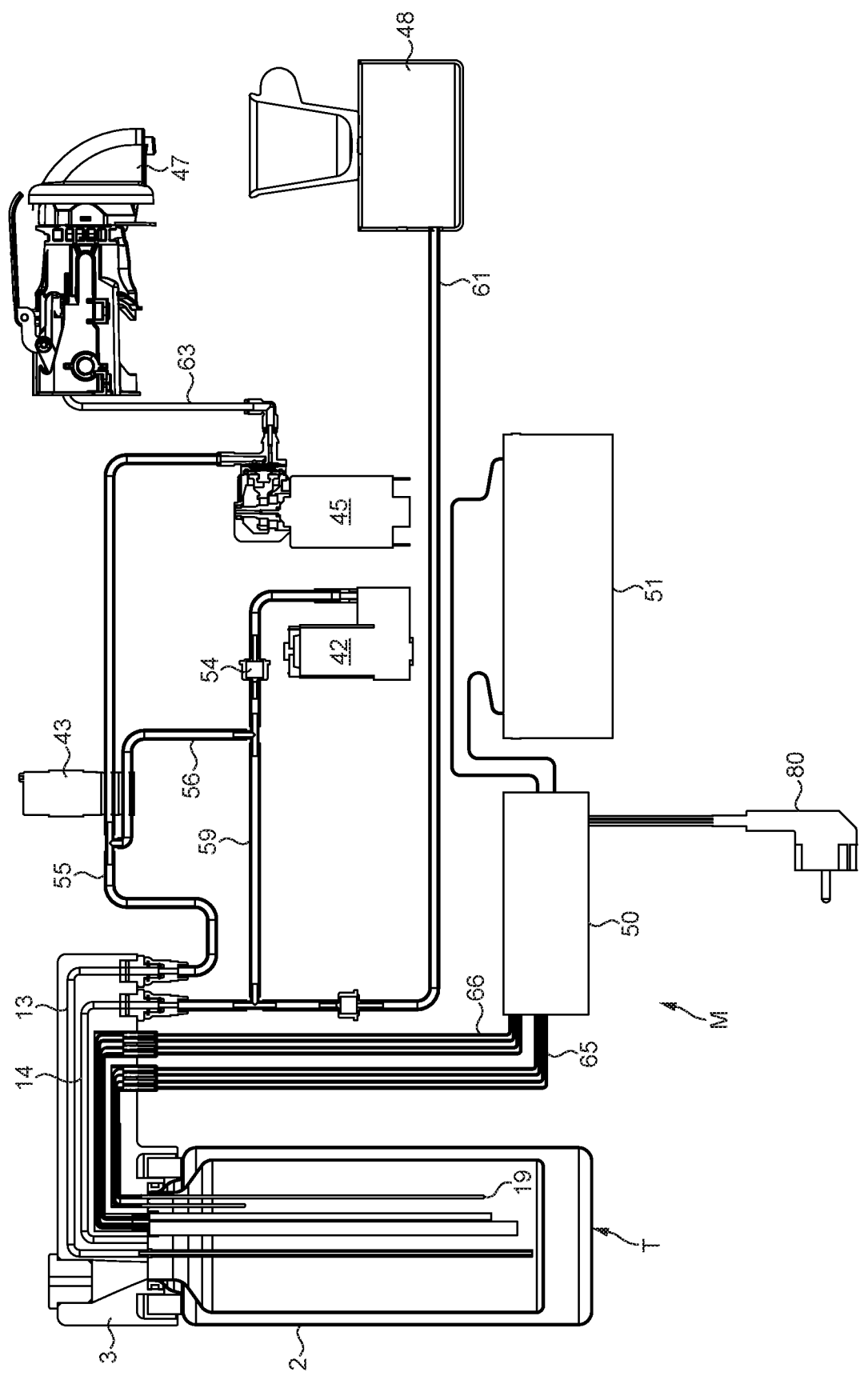
FIG. 9(*a-b*) comprises a liquid heating system according to a fifth embodiment of the present disclosure.
Figure 9B:
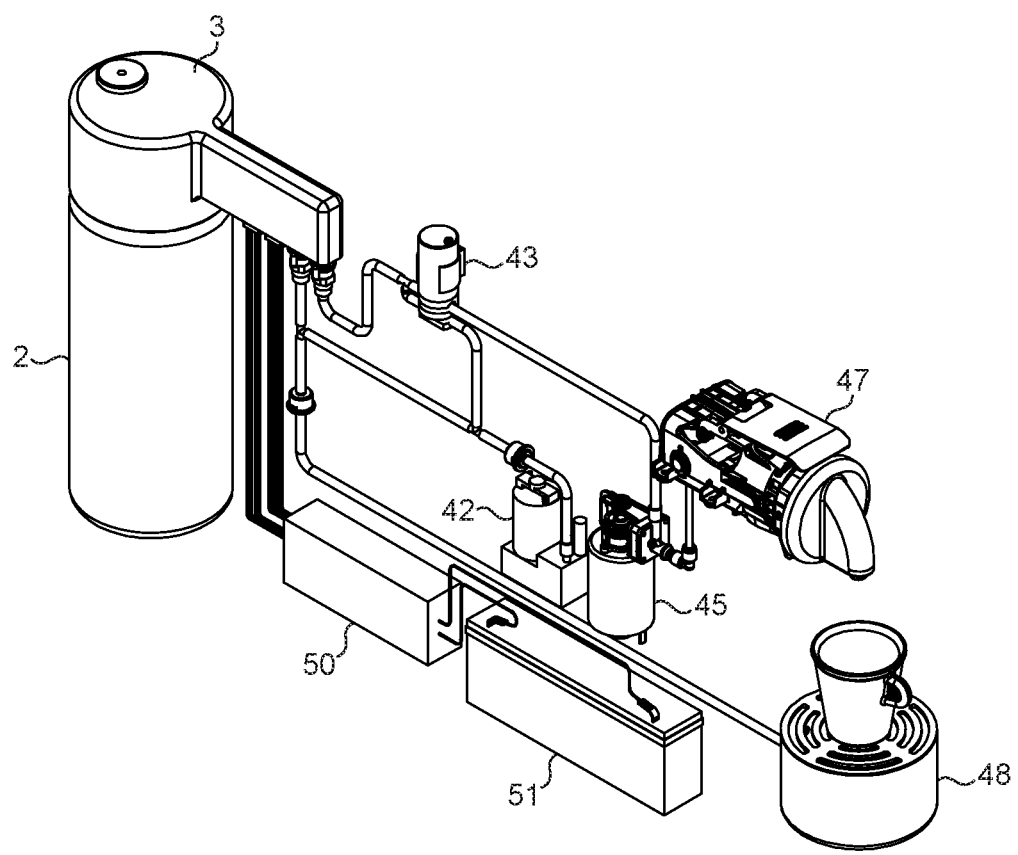

In FIG. 9, a machine like the machine M of FIG. 8 is shown but without control valve 46 and drainage fluid path 64. As already noted above, such a layout is used if the initial extraction temperature is less sensitive or if the length of the delivery means, particularly the first fluid path 57, is short.

FIG. 10 shows an embodiment of the machine M similar to FIG. 8 while using a tank T with an independent temperature control as, for instance, described with respect to FIG. 3 of the present disclosure. According to this embodiment, the function of controlling the temperature is thus integrated in the mobile liquid tank T. As already described above, such a type of mobile liquid tank T is aimed to be electrically charged (i.e. the mobile power source 7), filled (i.e. the inside of the tank body 2 with a liquid 1) and heated up (i.e. the liquid 1 inside the tank T) on a separate docking station D as, for instance, depicted in FIGS. 4 and 5 of the present disclosure. As a consequence, the system can be simplified and in particular when having the air-liquid-mixing system being provided in the docking station D as shown in FIGS. 4 and 5, an additional air-liquid-mixing system is not required on the machine M so that the control valve 44 and the fourth fluid path 60 including the check valve 53 can be omitted. This embodiment allows for a quick exchange of empty tanks T by tanks T already containing preheated liquid 1 while not being dependent on the battery charging of the machine M as the liquid temperature control can be powered by a separate mobile power source 7 rather than the mobile power source 51 of the machine M.

Finally, FIG. 11 shows an embodiment similar to FIG. 10 but without the control valve 46 and drainage fluid path 64 used in case the extraction temperature is less sensitive or the length of the delivery means, particularly the first fluid path 57, is short.

The tank T of the present disclosure can thus be filled and heated up either on a separate docking station D, for example (but not by way of limitation) also serving as mobile power source (e.g. battery) charger, or on/in a mobile machine M itself, supposing that the mobile machine M can be plugged to main power (i.e. external power source) for the heating and battery charging processes. A tank T paired with a docking station would for example (but not by way of limitation) integrate its own mobile power source 7 for an independent temperature control, whereas a tank T paired with a mobile machine M would not necessarily need its own mobile power source 7 but could simply use the mobile power source 51 of the mobile machine M.

The liquid heating system of the present disclosure, in particular a tank T paired with a mobile machine M, can be part of a trolley for servicing beverages in a mobile fashion such as in offices, hotels or meeting rooms. It can also be installed in other vehicles such as tricycles, buses, trains, cars, boats, planes, space vehicles and the like.

The present disclosure is not limited by the embodiments as described herein above. In particular, the features of the respective embodiments can be combined in any possible way as long as being covered by the dependent claims. It is further noted that according to the present disclosure, (closing) a connection between two features usually means a direct (for example (but not by way of limitation) shortest) connection between these features via the mentioned fluid paths within the delivery means; i.e. (exclusively) via respective fluid paths.

The invention claimed is:

1. A method for heating a liquid using a mobile liquid tank, the method comprising:
   providing a liquid to be heated in a tank body, the tank body comprising a first heating element and a second heating element, wherein the first heating element is configured to be connectable to an external power source of low voltage and the second heating element is configured to be connectable, separately from the first heating element, to a mobile power source of extra-low voltage;
   heating the liquid in the tank body to a predetermined temperature by the first heating element powered by the external power source;
   maintaining the temperature of the heated liquid substantially constant by the first heating element when external power is supplied to the first heating element and maintaining the temperature of the heated liquid substantially constant by the second heating element powered by the mobile power source of extra-low voltage when external power is no longer supplied by the external power source;
   measuring temperature data using a sensor in the tank body;
   receiving the temperature data from the sensor on a control unit connected to the sensor; and
   controlling regulation of the first heating element and the second heating element by the control unit using the temperature data as temperature input,
   wherein the first heating element and the second heating element are connected to separate electrical connectors protruding from at least one external wall of the tank body, the separate electrical connectors are configured for connectability to external electrical connectors and are plugs spatially arranged in parallel,
   the mobile liquid tank comprises the tank body, a first fluid path fluidly connecting a bottom of the tank body to a first fluid connector, and a second fluid path fluidly connecting a top of the tank body to a second fluid connector, wherein the mobile liquid tank is part of a system comprising a tank receiving device configured to receive the mobile liquid tank in a removable manner, wherein the tank receiving device comprises the control unit, the mobile power source, and at least one of the external electrical connectors, and a control valve for selectively connecting the first fluid path to an air pump or a liquid pump.

2. The method of claim 1, wherein the sensor comprises a first temperature sensor and a second temperature sensor extending a shorter length than the first temperature sensor into the tank body, wherein the measuring of the temperature data comprises using the first temperature sensor to measure a high liquid level temperature and using the second temperature sensor to measure a low liquid level temperature.

3. The method of claim 1, further comprising securing the mobile liquid tank in the tank receiving device in a removable manner, the tank receiving device comprising an external power electrical system for electrically connecting the first heating element to the external power source of low voltage.

4. The method of claim 1, wherein the controlling of the regulation of the first heating element and the second heating element by the control unit comprises:
   controlling and operating, by the control unit, the first heating element for heating up the liquid in the tank body automatically when the first heating element is connected to the external power source; and
   controlling and operating, by the control unit, the second heating element for taking over from the first heating element the heating of liquid in the tank body automatically when the first heating element is no longer connected to the external power source.

5. The method of claim 1, wherein the first heating element and the second heating element extend into the tank body from an upper opening of the tank body.

6. The method of claim 5, wherein the first heating element and the second heating element extend into the tank body from the upper opening downwardly toward a bottom of the tank body.

7. The method of claim 1, wherein the mobile liquid tank comprises a lid configured for reversibly covering or closing the tank body, and at least one of separate electrical connectors protrude from the lid, and wherein the first heating element and the second heating element extend from the lid inside the tank body.

8. A method for heating a liquid using a mobile liquid tank, the method comprising:
   providing a liquid to be heated in a tank body, the tank body comprising a first heating element and a second heating element, wherein the first heating element is configured to be connectable to an external power source of low voltage and the second heating element is configured to be connectable, separately from the first heating element, to a mobile power source of extra-low voltage;
   heating the liquid in the tank body to a predetermined temperature by the first heating element powered by the external power source;
   maintaining the temperature of the heated liquid substantially constant by the first heating element when external power is supplied to the first heating element and maintaining the temperature of the heated liquid substantially constant by the second heating element powered by a mobile power source of extra-low voltage when external power is no longer supplied by the external power source; and
   measuring temperature data using a first temperature control sensor in the tank body and a second temperature control sensor in the tank body, wherein the first temperature control sensor is longer than the second temperature control sensor;

receiving the temperature data from the first and second temperature control sensors on a control unit connected to the first and second temperature control sensors; and controlling regulation of the first heating element and the second heating element by the control unit using the temperature data from the first temperature control sensor and the second temperature control sensor as temperature input, the mobile liquid tank comprises the tank body, a first fluid path fluidly connecting a bottom of the tank body to a first fluid connector, and a second fluid path fluidly connecting a top of the tank body to a second fluid connector, wherein the mobile liquid tank is part of a system comprising a tank receiving device configured to receive the mobile liquid tank in a removable manner, wherein the tank receiving device comprises the control unit, the mobile power source, and at least one of the external electrical connectors, and a control valve for selectively connecting the first fluid path to an air pump or a liquid pump.

9. The method of claim 8, wherein the measuring of the temperature data comprises using the first temperature sensor to measure a high liquid level temperature and using the second temperature sensor to measure a low liquid level temperature.

10. The method of claim 8 further comprising securing the mobile liquid tank in the tank receiving device in a removable manner, the tank receiving device comprising an external power electrical system for electrically connecting the first heating element to the external power source of low voltage.

11. The method of claim 8, wherein the controlling of the regulation of the first heating element and the second heating element by the control unit comprises:

controlling and operating, by the control unit, the first heating element for heating up the liquid in the tank body automatically when the first heating element is connected to the external power source; and controlling and operating, by the control unit, the second heating element for taking over from the first heating element the heating of liquid in the tank body automatically when the first heating element is no longer connected to the external power source.

12. The method of claim 8, wherein the first heating element and the second heating element extend into the tank body from an upper opening of the tank body.

13. The method of claim 12, wherein the first heating element and the second heating element extend into the tank body from the upper opening downwardly toward a bottom of the tank body.

14. The method of claim 8, wherein the mobile liquid tank comprises a lid configured for reversibly covering or closing the tank body, and at least one of separate electrical connectors protrude from the lid, and wherein the first heating element and the second heating element extend from the lid inside the tank body.

\* \* \* \* \*